United States Patent
Morita et al.

(10) Patent No.: US 9,432,850 B2
(45) Date of Patent: Aug. 30, 2016

(54) WIRELESS COMMUNICATION SYSTEM, BASE STATION, MANAGEMENT SERVER, AND WIRELESS COMMUNICATION METHOD

(75) Inventors: Motoki Morita, Tokyo (JP); Kojiro Hamabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 673 days.

(21) Appl. No.: 13/279,918

(22) Filed: Oct. 24, 2011

(65) Prior Publication Data
US 2012/0099455 A1 Apr. 26, 2012

(30) Foreign Application Priority Data
Oct. 22, 2010 (JP) .................................. 2010-237039

(51) Int. Cl.
*H04J 1/16* (2006.01)
*H04W 16/10* (2009.01)
*H04W 16/08* (2009.01)
*H04W 16/32* (2009.01)
*H04W 84/10* (2009.01)

(52) U.S. Cl.
CPC ............. *H04W 16/10* (2013.01); *H04W 16/08* (2013.01); *H04W 16/32* (2013.01); *H04W 84/105* (2013.01)

(58) Field of Classification Search
CPC ... H04W 24/00; H04W 52/46; H04W 80/04; H04W 84/12; H04W 88/06; H04W 88/08; H04W 24/02; H04W 76/045; H04W 28/0236; H04W 52/24; H04W 72/04; H04W 72/082; H04W 36/20; H04W 36/30; H04W 36/0088; H04W 52/367; H04W 52/365; H04W 52/143; H04W 52/40; H04W 36/24; H04W 36/0083; H04W 36/0055; H04W 36/0011; H04L 43/08; H04L 2012/5636; H04B 7/18543; H04J 3/1682
USPC ........................ 370/232, 252, 318, 328, 468; 455/452.1, 453, 522
See application file for complete search history.

(56) References Cited

U.S. PATENT DOCUMENTS 6,138,024 A * 10/2000 Evans et al. ................ 455/452.2
7,948,936 B2 * 5/2011 Lohr .................... H04L 12/5693
                                                        370/230

(Continued)

FOREIGN PATENT DOCUMENTS

CN       1371225 A       9/2002
CN       101128016 A     2/2008

(Continued)

OTHER PUBLICATIONS

E. Seidel and E. Saad, "LTE Home Node Bs and its enhancements in Release 9", Nomor Research GmbH, May 2010, 5 pages.*

(Continued)

*Primary Examiner* — Brian O'Connor
(74) *Attorney, Agent, or Firm* — Sughrue Mion, PLLC

(57) ABSTRACT

A wireless communication system is provided including a first base station, and a second base station having a coverage area at least one part of which overlaps a coverage area of the first base station. The communication system includes a measurer that measures a utilization degree of at least one mobile station connected to the second base station, and an adjuster that adjusts a wireless resource allocation of the at least one mobile station connected to the second base station based upon the utilization degree.

17 Claims, 17 Drawing Sheets

(56) References Cited

U.S. PATENT DOCUMENTS

| | | | |
|---|---|---|---|
| 8,422,456 B2* | 4/2013 | Hayashi | H04W 36/10 370/315 |
| 8,532,054 B2* | 9/2013 | Osborn | 370/331 |
| 8,744,466 B2* | 6/2014 | Hirano et al. | 455/452.1 |
| 8,811,198 B2* | 8/2014 | Bhushan et al. | 370/252 |
| 8,817,750 B2* | 8/2014 | Choi-Grogan | H04W 36/0083 370/331 |
| 8,818,382 B2* | 8/2014 | Budic | H04W 52/143 455/443 |
| 8,830,818 B2* | 9/2014 | Damnjanovic | H04J 11/0093 370/217 |
| 8,843,131 B2* | 9/2014 | Patel | H04W 52/143 455/434 |
| 8,843,172 B2* | 9/2014 | He | H04W 52/50 455/452.1 |
| 9,060,311 B2* | 6/2015 | Karaoguz | H04W 36/0055 |
| 2002/0111184 A1 | 8/2002 | Takano et al. | |
| 2004/0160923 A1 | 8/2004 | Nobukiyo et al. | |
| 2008/0075006 A1* | 3/2008 | Morita | 370/232 |
| 2008/0248823 A1* | 10/2008 | Morita | 455/509 |
| 2009/0291691 A1* | 11/2009 | Jeong et al. | 455/450 |
| 2010/0067491 A1* | 3/2010 | Park et al. | 370/332 |
| 2010/0216477 A1 | 8/2010 | Ryan | |
| 2010/0255867 A1* | 10/2010 | Ishii et al. | 455/501 |
| 2010/0302981 A1* | 12/2010 | Tsai et al. | 370/311 |
| 2011/0021197 A1* | 1/2011 | Ngai | 455/436 |
| 2011/0059741 A1* | 3/2011 | Klein | 455/436 |
| 2011/0263242 A1* | 10/2011 | Tinnakornsrisuphap | H04W 36/04 455/422.1 |
| 2012/0122492 A1* | 5/2012 | Zhou et al. | 455/456.6 |
| 2012/0190374 A1* | 7/2012 | Jo et al. | 455/450 |
| 2012/0258720 A1* | 10/2012 | Tinnakornsrisuphap | H04W 36/04 455/442 |
| 2012/0270582 A1* | 10/2012 | Mese et al. | 455/501 |
| 2015/0031370 A1* | 1/2015 | Tinnakornsrisuphap | H04W 36/04 455/438 |

FOREIGN PATENT DOCUMENTS

| | | |
|---|---|---|
| CN | 101662775 A | 3/2010 |
| GB | 2428937 A | 2/2007 |
| JP | 09-163435 A | 6/1997 |
| JP | 2010171829 A | 8/2010 |
| JP | 2010233087 A | 10/2010 |
| WO | 00/72618 A1 | 11/2000 |
| WO | 2009/120689 A2 | 10/2009 |

OTHER PUBLICATIONS

Communication dated Apr. 13, 2015 from the State Intellectual Property Office of the People's Republic of China in counterpart application No. 201180050916.2.

Yun et al., "Traffic density based power control scheme for Femto AP", Personal Indoor and Mobile Radio Communications(PIMRC) 2010 IEEE 21st Internal Symposium, Sep. 26-30, 2010, pp. 1378-1383.

Communication dated Jun. 24, 2015 from the Japanese Patent Office issued in corresponding Japanese application No. 2013516869.

Communication dated Jul. 21, 2016 from the European Patent Office in counterpart Application No. 11834054.6.

* cited by examiner

FIG. 16
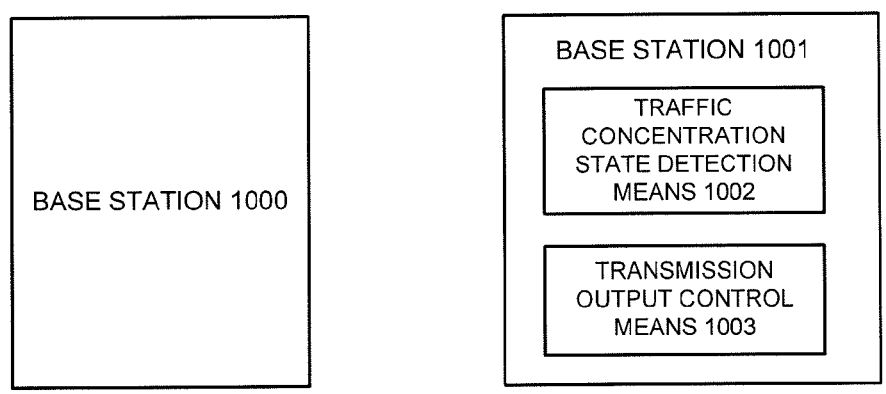
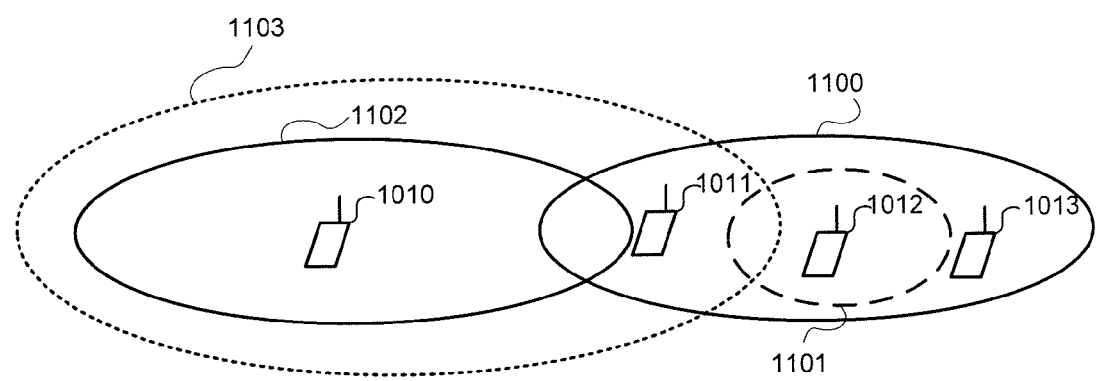

WIRELESS COMMUNICATION SYSTEM, BASE STATION, MANAGEMENT SERVER, AND WIRELESS COMMUNICATION METHOD

INCORPORATION BY REFERENCE

This application is based upon and claims the benefit of priority from Japanese patent application No. 2010-237039, filed on Oct. 22, 2010, the disclosure of which is incorporated herein in its entirety by reference.

RELATED ART

Apparatuses and methods consistent with exemplary embodiments relate to a wireless communication system, a base station, a management server, and a wireless communication method.

Recently, with an increase in a demand for voice communication and data communication indoors accompanied by prevalence of mobile telephones, a development of a base station that can be installed in rooms such as a user's house and a small-scale office is being progressed. A scope to be covered by this base station that can be installed indoors is extremely small as compared with a scope (macrocell) to be covered by the existing base station (macro base station) that is installed outdoors, so it is called a femtocell. Hereinafter, the base station forming the femtocell is called a femto base station.

The femto base station and the macro base station in an existing mobile communication network transmit a common pilot signal. A mobile station carries out synchronized establishment, channel estimation and the like, and transmits/receives data to/from the base station by receiving the above common pilot signal. For this, it is necessary to make a configuration so that the mobile station can receive the common pilot signal at an excellent received quality in order to provide an excellent communication quality.

A transmission power of the common pilot signal to be transmitted by each cell is settled in a fixed manner in the macro base station of the existing mobile communication network. On the other hand, it is being investigated that the femto base station autonomously sets the transmission power of the common pilot signal that the femto base station transmits in the femtocell. Such a method is disclosed, for example, in British Patent Laid-open No. 2428937.

A specific example of the method of setting the transmission power of the femto base station disclosed in the British Patent Laid-open No. 2428937 will be explained by employing FIG. 15. In FIG. 15, a macro base station 811 forms a macrocell 801, transmits a common pilot signal CP1 with a constant transmission power, and makes communication with mobile stations (not shown in the figure). Femto base stations 812A and 812B form femtocells 802A and 802B, and make communication with mobile stations 700A and 700B, respectively. Each of the femto base stations 812A and 812B measures received power Pmacro [dBm] of the common pilot signal CP1 of the macro base station 811, and transmits common pilot signals CP2A and CP2B with Pmarco+Poffset [dBm] as a transmission power by employing a wireless frequency band identical to that of the macro base station 811. Herein, Poffset, which is a power offset, is a constant value common to all of the femtocells 802A and 802B.

It is being investigated that the femto base station mentioned above is used in the system such as W-CDMA (Wideband Code Division Multiple Access) and E-UTRAN (Evolved Universal Terrestrial Radio Access Network, or it is also called LTE: Long Term Evolution) with the wireless communication standards of the mobile telephones, and in the system such as IEEE (Institute of Electrical and Electronics Engineers) 802.16m with the wireless communication standards of wireless MAN (Wireless Metropolitan Area Network).

In the W-CDMA, the data transmission employing dedicated channels subjected to a transmission power control in an uplink and a downlink, and the data transmission employing a common channel in a downlink are carried out. Further, in the E-UTRAN, a band of a radio frequency is divided into a plurality of resource blocks (PRB: Physical Resource Block). Specifically, a scheduler mounted in the base station of E-UTRAN allocates the PRB, and the base station makes the data communication with the mobile stations by employing the allocated PRB. In addition, in the IEEE 802.16m, OFDMA (Orthogonal Frequency Division Multiple Access) is adopted for the communication standard, the band of the radio frequency is divided into sub-carriers, the scheduler mounted in the base station allocates the sub-carriers, and the data communication employing the allocated sub-carriers is made. Additionally, what is obtained by bundling the sub-carriers is equivalent to the resource block that is called in the E-UTRAN.

Further, the traffic load distributing technique of distributing traffics concentrated at a specific base station to other base stations is disclosed in JP-P1997-163435A.

In the technology of the JP-P1997-163435A, as shown in FIG. 16, each of base stations 1000 and 1001 is provided with a traffic concentration state detection means 1002 and a transmission output control means 1003. The traffic concentration state detection means 1002 detects the traffic concentration state exceeding a specified speech enable channel caused by the concentration of terminal devices 1011 to 1013 into a speech area 1100 of its own base station 1001. The transmission output control means 1003 lowers a control channel signal level of its own base station 1001 at the time of that detection, instructs a peripheral base station 1000 to raise a signal level, and further, raises the signal level responding to the instruction coming from the peripheral base station 1000.

In the base station 1001, when the traffic concentration state is detected by the traffic concentration state detection means 1002, the transmission output control means 1003 lowers the signal level of the base station 1001 that is in a traffic concentrate state, and reduces the speech area 1100 to a speech area 1101. On the other hand, upon receipt of the traffic concentration state of the base station 1001, the base station 1000 raises the level of the transmission output, and enlarges a speech area 1102 to a speech area 1103. And, the terminal device 1011, which has received the control channel signal of the base station 1001 up to the moment, enters the speech area 1103 to receive the signal of the base station 1000.

Additionally, the speech area and the communication area including the data communication together with voice are generally called coverage.

As mentioned above, when the traffics concentrated at a specific base station is distributed to the peripheral base station, the signal level of the above base station is lowered, and the signal level of the peripheral base station is raised. As a result, the speech area of its own base station becomes small, and the speech are of the peripheral base station becomes large, thereby distributing the traffics concentrated at a specific base station to the other base stations.

PTL 1: British Patent Laid-open No. 2428937
PTL 2: JP-P1997-163435A

By the way, a utilization frequency of the femto base station differs user by user. For example, there exist a user (light user) who does not use the femto base station so much, and a user (heavy user) who frequently uses the femto base station. The times during which a downlink transmission power of the femto base station for the mobile station of the light user becomes large are infrequent. On the other hand, the times during which the downlink transmission power for the mobile station of the heavy user becomes large are frequent.

The case that each of the macro base station 811 and the femto base station 812A in the Patent literature 1 makes communication with the mobile stations is studied while the above-described contents are taken into consideration. It is assumed that, as shown in FIG. 17, the mobile station 900 makes a connection to and communication with the macro base station 811 and the mobile station 700A makes a connection to and communication with the femto base station 812A and makes communication. Herein, when the femto base station 812A has a function of giving permission of the connection only to the pre-registered mobile stations, the mobile station 700A is a registered mobile station registered to the femto base station 812A. On the other hand, the mobile station 900 is a non-registered mobile station not registered to the femto base station 812A.

In a situation shown in FIG. 17, for example, when the user of the mobile station 700A who makes a connection to the femto base station 812A is the light user, even though the macro base stations 811 and the femto base station 812A make communication with the mobile station 900 and the mobile station 700A by employing the identical frequency band, respectively, the times during which the downlink transmission power becomes large are infrequent, and an influence of a downlink signal DS2 to be transmitted from the femto base station 812A to the mobile station 700A that is exerted upon a downlink signal DS1 to be transmitted from the macro base station 811 to the mobile station 900 is little.

However, when the user of the mobile station 700A who makes a connection to the femto base station 812A is the heavy user, the times during which the downlink transmission power becomes large are frequent. As a result, when the macro base stations 811 and the femto base station 812A make communication with the mobile station 900 and the mobile station 700A by employing the identical frequency band, respectively, the downlink signal DS2 to be transmitted from the femto base station 812A to the mobile station 700A becomes an interference to the downlink signal DS1 to be transmitted from the macro base station 811 to the mobile station 900, and hence, a quality of the downlink signal DS1 deteriorates.

Further, when the macro base station 811 increases the transmission power of the downlink signal DS1 in order to avoid a quality deterioration of the downlink signal DS1, a downlink capacity of the macro base station 811 is reduced, which causes the throughput of the macrocell 801 to deteriorate.

However, the method of setting the transmission power of the femto base station disclosed in the Patent literature 1 decides the transmission power of the common pilot signal of the femto base station by adding a fixed power offset Poffset to the received power of the common pilot signal coming from the macro base station. That is, the setting method disclosed in the Patent literature 1 decides the transmission power of the common pilot signal of the femto base station responding to the received power of the common pilot signal coming from the macro base station.

Thus, the method of setting the transmission power of the femto base station disclosed in the Patent literature 1 does not take into consideration an influence upon the microcell that originates in the fact that the time in which the downlink transmission power becomes large becomes long, as is the case with the heavy user who frequently uses the femto base station 812A. That is, the method disclosed in the Patent literature 1 does not take into consideration a change in the transmission power responding to a utilization degree at which the user utilizes the femto base station, and does not take into consideration at all a difference of the interference to the macrocell that originates in this.

Further, it is estimated that the wireless communication system of the Patent literature 2 is configured of the base station that covers a wide constant scope, like the macro base station, one part of the speech area that the macro base station forms overlaps the speech area of the other macro base stations, and the terminal device can make communication by making a connection to anyone of the base stations.

Thus, applying the technology of the Patent literature 2 for the wireless communication system such that it is configured of the macro base station and the femto base station, the speech area of the femto base station overlaps the speech area of the macro base station including a connotative relation, and only a specific terminal device can make a connection to the femto base station causes the following problems.

For example, when the traffic of the femto base station is high, lessening the transmission power of the femto base station, and enlarging the transmission power of the macro base station allows the terminal device connected to the femto base station to be handed over to the macro base station. However, the communication with the macro base station is often poor as compared with the communication with the femto base station because many terminal devises make connection to the macro base station, and the macro base station is positioned relatively away from the terminal devices (in the first place, the femto base station is installed in many cases because the communication with the macro base station is poor.) Thus, the problem that the throughput of the terminal device connected to the macro base station deteriorates takes place.

On the other hand, when the traffic of the macro base station is high, by enlarging the transmission power of the femto base station, and lessening the transmission power of the macro base station, an attempt for handing over the terminal device connected to the macro base station to the femto base station is made. However, the above terminal device cannot make a connection to the femto base station, and as a result, the problem that the interference to the macro base station by the femto base station is simply increased takes place.

SUMMARY

One or more exemplary embodiments provide a wireless communication system including a first base station, and a second base station of which at least one part of the coverage overlaps the coverage of the first base station, in which the interference by the second base station to the coverage of the first base station is reduced based upon the utilization degrees of the mobile stations connected to the second base station, a base station, a managing server, and a wireless communication method.

According to an aspect of an exemplary embodiment, a wireless communication system includes a first base station, and a second base station of which at least one part of the coverage overlaps the coverage of the aforementioned first base station, which includes a measurer that measures utilization degrees of the mobile stations connected to the second base station, and an adjuster that adjusts wireless resource allocation of the aforementioned mobile stations connected to the aforementioned second base station based upon the aforementioned utilization degrees.

According to an aspect of another exemplary embodiment, a base station of which at least one part of the coverage overlaps the coverage of the other base stations, includes a measurer that measures utilization degrees of the mobile stations connected to its own base station, and an adjuster that adjusts wireless resource allocation of the aforementioned mobile stations connected to the aforementioned its own base station based upon the aforementioned utilization degrees.

According to an aspect of another exemplary embodiment, a management server is provided in a wireless communication system including a first base station and a second base station of which at least one part of the coverage overlaps the coverage of the aforementioned first base station, which is connected to the aforementioned second base station via a network, and includes a measurer that measures utilization degrees of the mobile stations connected to the second base station, and an adjuster that instructs the aforementioned second base station to adjust wireless resource allocation of the aforementioned mobile stations connected to the aforementioned second base station based upon the aforementioned utilization degrees.

According to an aspect of another exemplary embodiment, a wireless communication method is provided in a wireless communication method including a first base station and a second base station of which at least one part of the coverage overlaps the coverage of the aforementioned first base station, which measures utilization degrees of the mobile stations connected to the second base station, and adjusts wireless resource allocation of the aforementioned mobile stations connected to the aforementioned second base station based upon the aforementioned utilization degrees.

One or more exemplary embodiments make it possible to reduce the interference by the second base station to the coverage of the first base station in the wireless communication system including the first base station and the second base station of which at least one part of the coverage overlaps the coverage of the first base station.

BRIEF DESCRIPTION OF THE DRAWINGS

These and/or other aspects and advantages will become more apparent upon a reading of the following detailed description and drawings, in which:

FIG. 16 is a view for explaining technology of the related art;

EXEMPLARY EMBODIMENTS

Exemplary embodiments will be explained.

Figure 1:
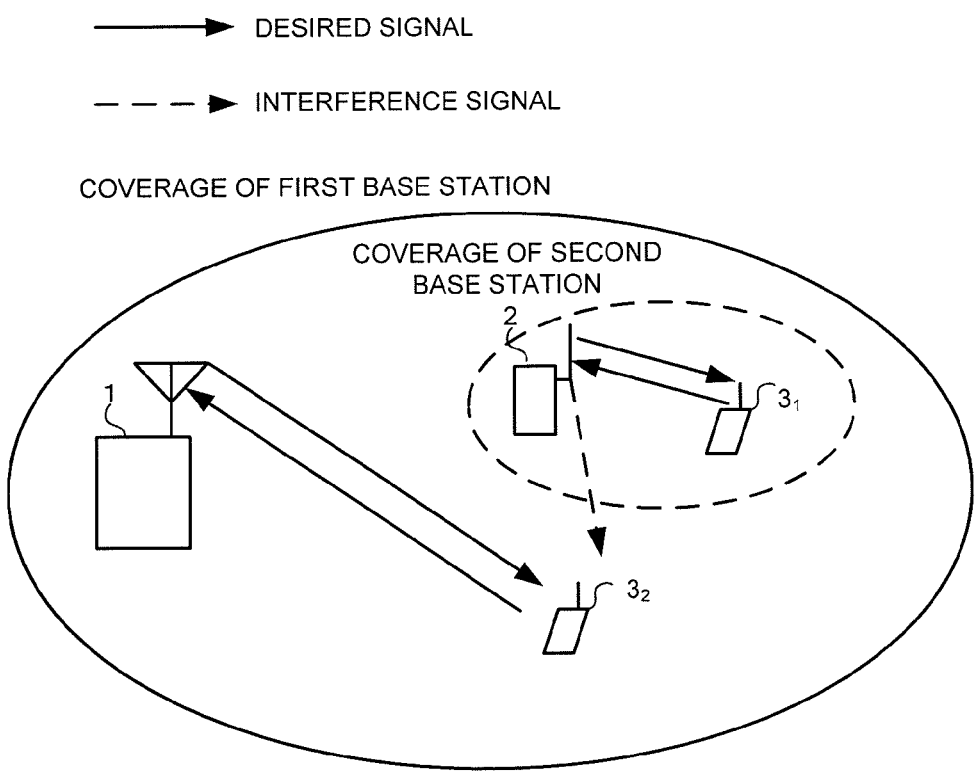
FIG. 1 is a view for explaining a wireless communication system to which exemplary embodiments are applied.

FIG. 1 is a view for explaining a wireless communication system to which the exemplary embodiments are applied.

The wireless communication system to which exemplary embodiments are applied, as shown in FIG. 1, includes a first base station 1, and a second base station 2 of which at least one part of the coverage overlaps the coverage of the first base station 1. And, a mobile station $3_1$ makes a connection to the second base station 2, and makes communication, and a mobile station $3_2$ makes a connection to the first base station 1, and makes communication. Additionally, when the second base station 2 has a function of giving permission of the connection only to the pre-registered mobile stations, the mobile station $3_1$ is a registered mobile station registered to the second base station 2. On the other hand, the mobile station $3_2$ is a non-registered mobile station not registered to the second base station 2. Herein, while the first base station is, for example, a macro base station, and the second base station is a femto base station, the first base station and the second base station are not limited hereto, and any kind of the base station is accepted so long as it is a base station playing a similar role. In addition, when the first base station is a macro base station, the coverage of the first base station 1 is a macrocell, and when the second base station is a femto base station, the coverage of the second base station 2 is a femtocell.

Figure 2:
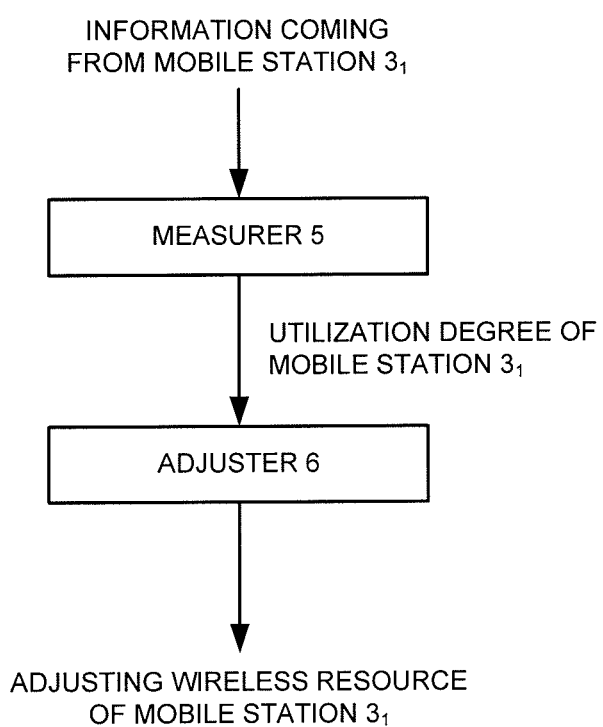
FIG. 2 is a block diagram of an exemplary embodiment.

In the wireless communication system as mentioned above, this exemplary embodiment, as shown in FIG. 2, includes a measurer 5 that measures the utilization degree of the mobile station $3_1$, and an adjuster 6 that adjusts the wireless resource to be allocated to the mobile station $3_1$ connected to the second base station 2, based upon the aforementioned utilization degree. Additionally, the second base station 2 may be provided with the measurer 5 and the adjuster 6, and the management server existing in a network side may be provided therewith.

The utilization degree of the mobile station $3_1$ that the measurer 5 measures is indicative of the utilization degree at which the mobile station $3_1$ utilizes the second base station 2. The utilization degree is an index value based upon, for example, a resource usage ratio of the mobile station $3_1$ that makes communication via the second base station 2, a transmission traffic (or throughput) indicative of a data quantity per a predetermined observation time transmitted to the mobile station $3_1$ by the second base station 2, a transmission time ratio (for example, a time ratio at which the data has been actually transmitted within a predetermined period), a resource usage time ratio (for example, a time ratio at which the resource usage ratio has exceeded a predetermined threshold (for example, 90% etc.) within a predetermined period) and the like. However, the so-called resource herein represents at least one of the transmission power in the wireless communication, the frequency band, and the transmission time slot.

Additionally, when a plurality of the mobile stations $3_1$ connect to the second base station 2, the measurer 5 measures the utilization degree for each mobile station $3_1$. That is, an adjuster 6 to be described later adjusts the wireless resource for each mobile station $3_1$ by the measurement of the utilization degrees of the mobile stations $3_1$.

Figure 3:
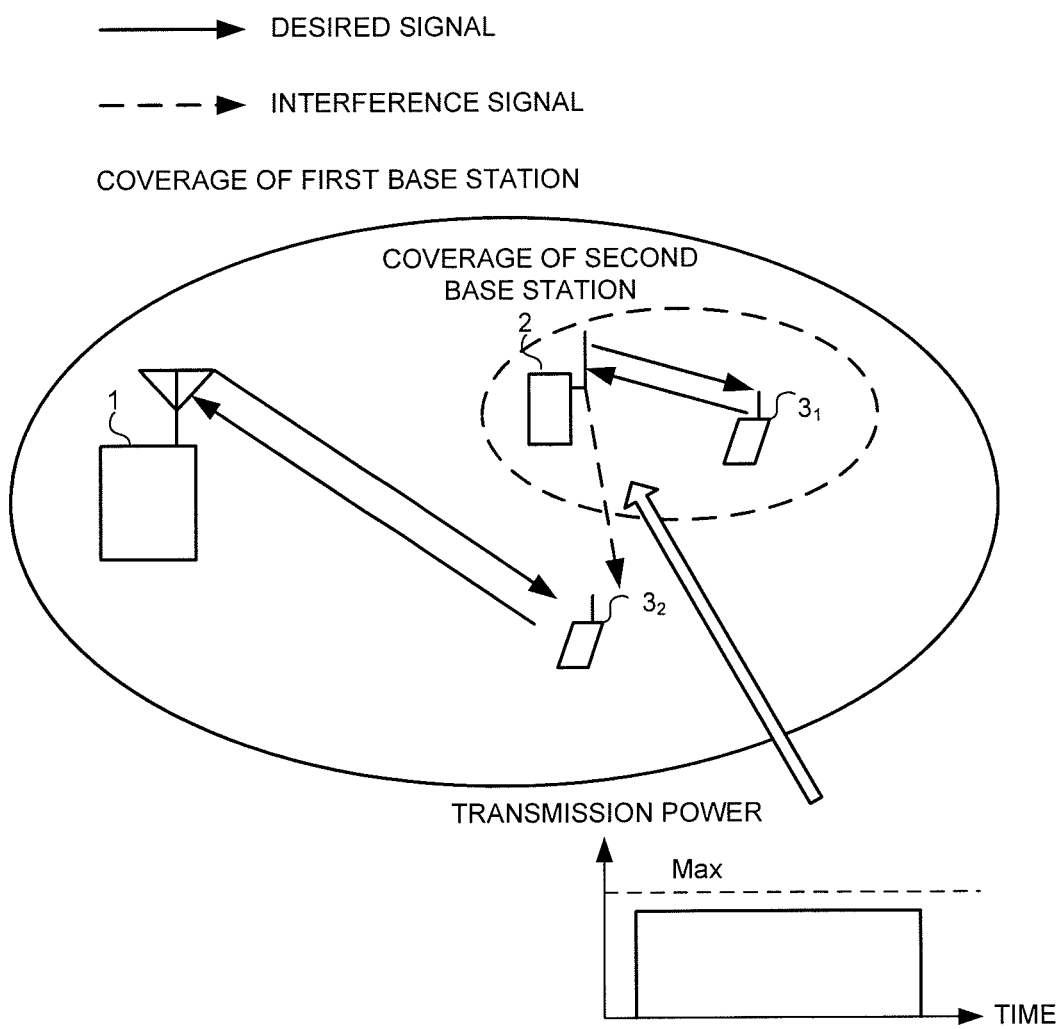
FIG. 3 is a view for explaining an exemplary embodiment.
Figure 4:
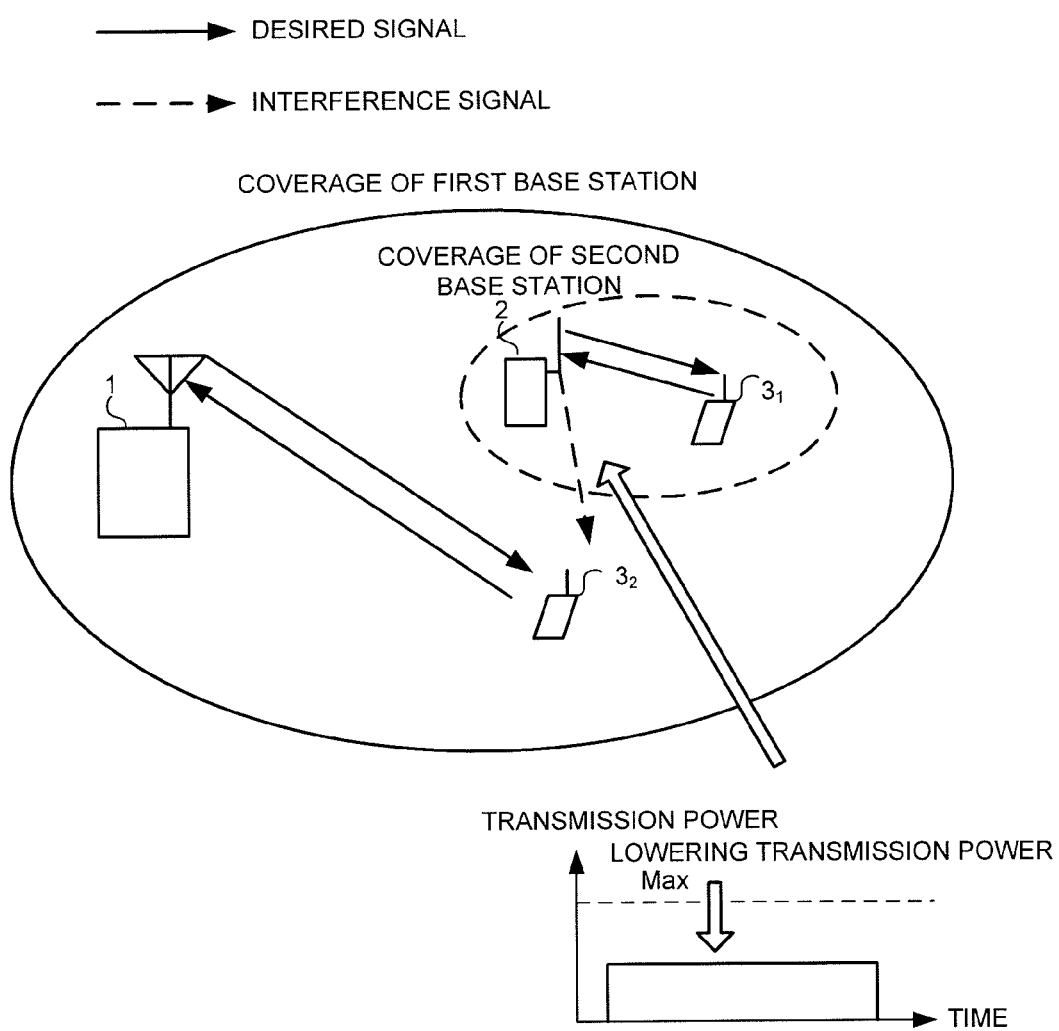
FIG. 4 is a view for explaining an exemplary embodiment.

The adjuster 6 adjusts the wireless resources of the mobile stations $3_1$ so as to avoid the interference, which is caused by the second base station 2. to the coverage of the first base station 1, based upon the utilization degrees of the mobile stations $3_1$ measured by the measurer 5. Specifically, as shown in FIG. 3, when the utilization degree of the mobile station $3_1$ is high (for example, when the index value of the utilization degree exceeds a predetermined first threshold, or the like), the state in which the transmission power of the second base station 2 is high continues, and the signal of the second base station 2 becomes an interference signal to the mobile station $3_2$, which causes the throughput to deteriorate. Thereupon, as shown in FIG. 4, the adjuster 6 adjusts the wireless resource of the second base station 2.

As a specific example of the adjustment of the wireless resource, there exists the adjustment of reducing the setting value of the transmission power of the second base station 2, the adjustment of reducing the transmission frequency band, the adjustment of reducing the transmission time slot, or the like. In FIG. 4, the adjustment of reducing the setting value of the transmission power is shown in the figure as an example.

As the adjustment of reducing the setting value of the transmission power, not only the transmission power of each channel (a reference or pilot signal, a control channel, and a data channel) may be evenly reduced by the identical value (for example, 1 dB etc.), but also the transmission power alone of the data channel of the mobile station of which the utilization degree is high may be reduced by a predetermined quantity (for example, 1 dB etc.) as well as the maximum transmission power may be reduced by a predetermined quantity (for example, 1 dB etc.). And, when the adjustment of lowering the setting value of the transmission power is performed, the adjuster 6 performs the scheduling in consideration of a change in the transmission power per a resource block due to a reduction in the transmission power of each channel.

Further, with the adjustment of reducing the transmission frequency band, the available band may be restricted to a predetermined band of all frequency bands (for example, 10 MHz is restricted to 5 MHz) or the like. When the adjustment of the resource is performed by reducing the frequency band, the adjuster 6 performs the scheduling from among the resource blocks existing in the reduced frequency band.

Further, the adjustment of reducing the transmission time slot may be performed by restricting the transmittable time slot to a predetermined time slot within 1 subframe, or the like (for example, with the case of 2 time slots per 1 subframe, two time slots are restricted to one time slot). When the adjustment of the resource is performed by reducing the transmission time slot, the adjuster 6 performs the scheduling for the resource block having a time region in which no transmission is made within 1 subframe.

Additionally, with the adjustment of the wireless resource by the adjuster 6, the resource is reduced at an extent with which the mobile station $3_1$ is not handed over to the other base stations, for example, to the first base station 1. For example, only the transmission power of the data channel may be reduced. At this time, an influence is not exerted upon the coverage because the transmission power for the pilot signal is not changed. Or, the received powers of the pilot signal of the first and second base stations in the mobile station $3_1$ are measured, and the transmission power of each channel may be reduced under the condition that the received power of the pilot signal of the second base station 2 exceeds the received power of the pilot signal of the first base station 1 by a predetermined quantity.

Further, when a plurality of the users utilize the second base station 2, that is, when a plurality of the mobile stations $3_1$ utilizes the second base station 2, the adjuster 6 individually adjusts the wireless resources of the mobile stations $3_1$ responding to the utilization degree of each mobile station $3_1$. For example, the adjuster 6 reduces allocation of the wireless resource to the mobile station $3_1$ of which the utilization degree is high, based upon the utilization degree of each mobile station $3_1$ measured by the measurer 5, and increases a quantity of the wireless resource that is not used by the above base station (for example, the adjuster 6 reduces the transmission power of the data channel of the mobile station $3_1$ of which the utilization degree is high).

Additionally, when the utilization degree of the mobile station $3_1$ is low (for example, when the index value of the utilization degree is equal to or less than a predetermined second threshold (<a first threshold) or the like), the adjuster 6 may gradually increase the reduced wireless resource of the second base station 2 (for example, the setting value of the transmission power (the transmission power and the maximum value of the reference signal, the control channel, and the data channel)) so that it returns to the original value. In the case other than it (for example, the index value of the utilization degree is equal to or more than the second threshold, and is equal to or less than the first threshold, or the like), the adjuster 6 may not change the wireless resource.

As mentioned above, the wireless resources to be allocated to the mobile stations $3_1$ connected to the second base station 2 are adjusted based upon the utilization degrees of the mobile stations $3_1$ connected to the second base station 2, whereby the possibility that the signal of the second base station 2 becomes an interference signal to the mobile station $3_2$ is decreased, and an influence of the second base station 2 of which an interference to the coverage of the first base station 1 is large alleviated, and a deterioration in the throughput in the coverage of the first base station 1 can be avoided.

Hereinafter, specific exemplary embodiments will be explained.

First Exemplary Embodiment

The first exemplary embodiment will be explained.

Figure 5:
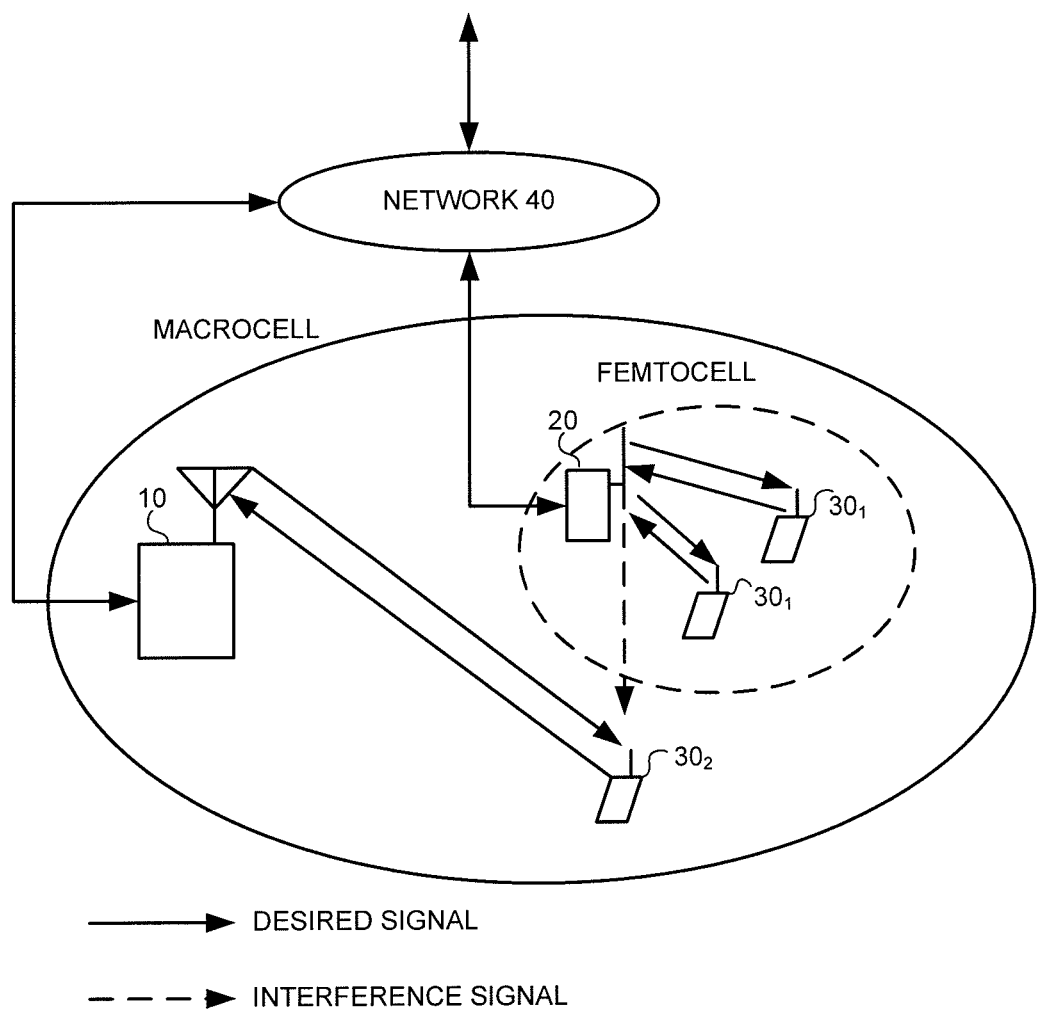
FIG. 5 is a schematic view of the wireless communication system of a first exemplary embodiment.

FIG. 5 is a schematic view of the wireless communication system of the first exemplary embodiment.

In the first exemplary embodiment, an example in which the first base station is a macro base station 10, the second base station is a femto base station 20, the femto base station 20 autonomously measures the utilization degrees of the mobile stations $30_1$ existing within the femtocell, and adjusts the wireless resources to be allocated to the mobile stations $30_1$ will be explained. Additionally, in the following, the utilization degree is assumed to be a resource usage ratio of the mobile station $30_1$, and the case of adjusting the transmission power of the data channel as the adjustment of the wireless resource will be explained.

The macro base station 10 connected to a network 40 forms a macrocell, and a mobile station $30_2$ existing within the macrocell is connected to the macro base station 10.

Further, the femto base station 20 connected to the network 40 forms a femtocell, and a plurality of the mobile stations $30_1$ existing within the femtocell are connected to the femto base station 20.

Figure 6:
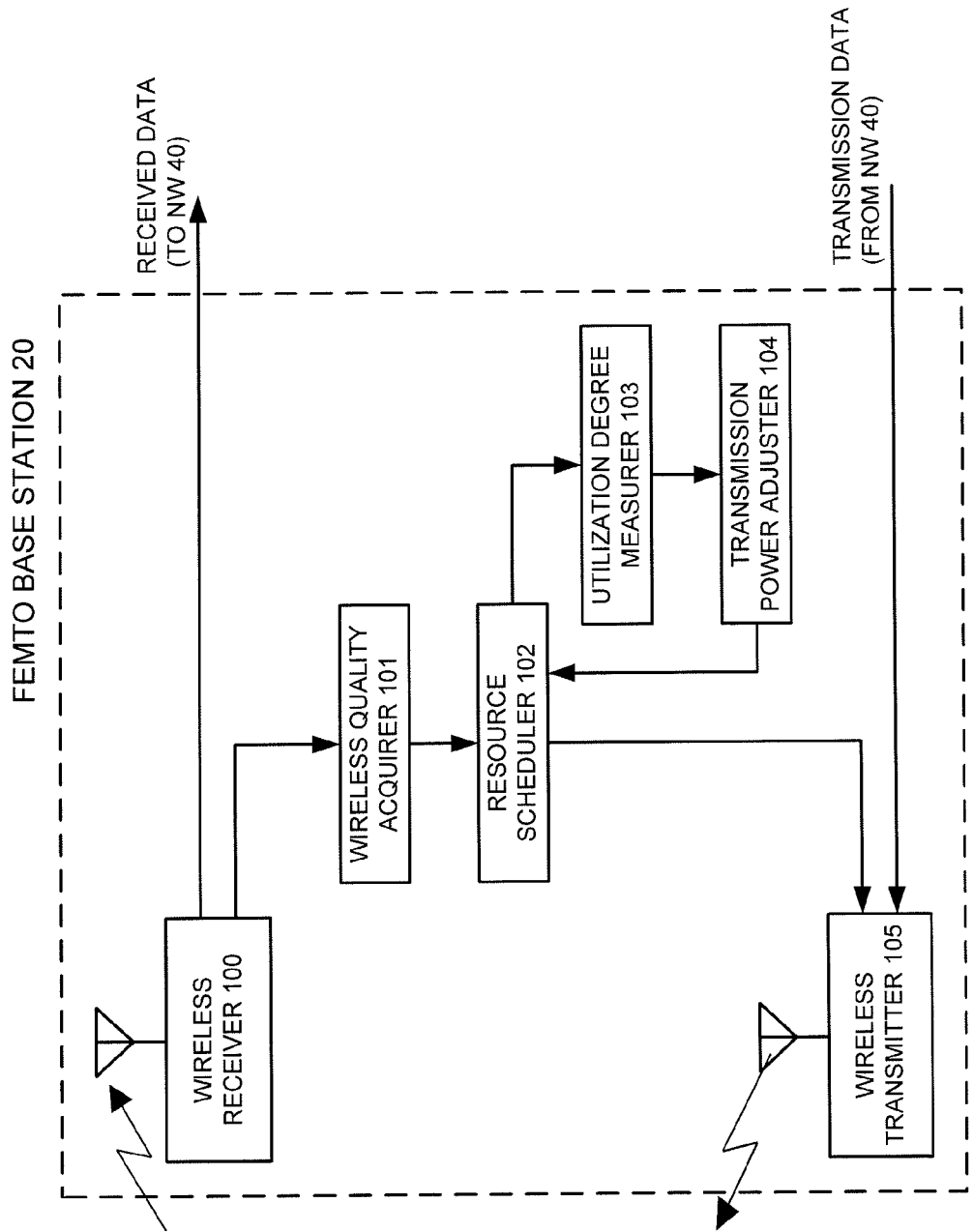
FIG. 6 is a block diagram of a femto base station 20.

FIG. 6 is a block diagram of the femto base station 20.

The femto base station 20 is provided with a wireless receiver 100 that receives the signal of the uplink, a wireless quality acquirer 101, a resource scheduler 102, a utilization degree measurer 103, a transmission power adjuster 104, and a wireless transmitter 105 that transmits the signal of the downlink.

The wireless quality acquirer 101 acquires a measurement report including quality information indicative of the received quality of the downlink signal of the femto base station 20 measured by the mobile station $30_1$ within the femtocell. In the case of W-CDMA, for example, the received power (RSCP: Received Signal Code Power) or the received quality (SINR: Signal-to-Interference plus Noise power Ratio, Ec/No etc.) at the moment of receiving the pilot signal that is transmitted by employing all frequency bands can be used as the received quality of downlink signal. In the case of E-UTRA, for example, the received power (RSRP: Reference Signal Received Power) or the received quality (RSRQ: Reference Signal Received Quality) at the moment of receiving the reference signal that is transmitted by employing a predetermined downlink resource element can be used as the received quality of downlink signal. The items to be actually measured, and the setting of a reporting period etc., can be informed, by the network 40, to the femto base station 20. The measurement report is discretized into CQI (Channel Quality Indicator), and is transmitted to the femto base station 20 from the mobile station $30_1$ by employing the uplink control channel. As a method of preparing the CQI, any method can be selected among a plurality of the methods such as the method of preparing one CQI in all bands, and the method of preparing the CQI for each divided frequency unit.

The resource scheduler 102 performs the scheduling of the wireless resource for the wireless communication between the mobile station $30_1$ and the femto base station 20. The quality information of the downlink received quality acquired by the wireless quality acquirer 101, and an adjustment result by the transmission power adjuster 104, which is described later, are reflected into this scheduling. The resource scheduler 102, by making a reference to the downlink received quality, decides the communication rate at which the transmission can be made by employing each frequency-divided/time-divided resource unit (for example, the resource block of E-UTRA). When a plurality of the mobile stations $30_1$ are connected to the femto base station 20, the resource scheduler 102 decides the resource that is allocated to each of the mobile stations $30_1$ base upon the quality information reported from a plurality of the mobile stations $30_1$.

The utilization degree measurer 103 measures the resource usage ratios of the mobile stations $30_1$ by making a reference to the scheduling result by the resource scheduler 102. Specifically, the utilization degree measurer 103 calculates a ratio (resource usage ratio) of the number of the resource blocks used for each mobile station $30_1$ over the number of all resource blocks (that correspond to the frequency bands) in a predetermined transmission time interval (TTI). For example, when the number of all resource blocks is 50, and the number of the resource blocks used by a certain mobile station $30_1$ is 40, the resource usage ratio of the above mobile station $30_1$ in the above TTI is 0.8 (=40/50). This is acquired for a predetermined measurement interval (for example, one second), all samples are averaged for a predetermined averaged time (for example, one hour), and the averaged resource usage ratio is obtained for each mobile station $30_1$. Additionally, the time scale may be short because the resource usage ratio has a relation to an operation of the scheduler.

Additionally, the resource scheduler 102 identifies each mobile station $30_1$ by employing ID of each mobile station $30_1$, and performs the scheduling. Thus, as a result of the scheduling, it can be grasped how many resource blocks are allocated to which mobile station $30_1$, whereby operating the above-described calculation by making a reference to the resource blocks allocated to the mobile stations $30_1$ makes it possible to acquire the utilization degree for each mobile station $30_1$.

Further, as the index of the utilization degree that the utilization degree measurer 103 measures, the transmission traffic is also possible. Specifically, it is assumed that the data quantity per a predetermined observation time transmitted by the mobile station $30_1$ connected to the femto base station 20 is the transmission traffic. For example, when the data quantity of 1 GByte has been transmitted for a certain day, the transmission traffic becomes 1 GByte/day.

The transmission power adjuster 104 determines whether the wireless resource allocation of each mobile station $30_1$ needs to be adjusted by employing the measurement result by the utilization degree measurer 103, and adjusts the wireless resource that is allocated to each mobile station $30_1$ when it is determined that it needs to be adjusted.

With the determination of the adjustment of the wireless resource, for example, when the averaged resource usage ratio of a certain mobile station $30_1$ has exceeded a first threshold (for example, 0.8), the transmission power adjuster 104 determines that the transmission power of the data channel of the above mobile station $30_1$ needs to be adjusted. Additionally, with the case of the transmission traffic, the transmission power adjuster 104 compares the transmission traffic with the threshold for each predetermined observation time, and determines that the transmission power of the femto base station 20 needs to be adjusted until the next observation time when the above transmission traffic exceeds the threshold.

When the transmission power adjuster 104 determines that the transmission power of the data channel of the mobile station $30_1$ needs to be adjusted, it adjusts the transmission power of the data channel of the mobile station $30_1$. With the adjustment of the transmission power of the data channel, only the transmission power of the data channel of the mobile station $30_1$ of which the averaged resource usage ratio has exceeded the first threshold (for example, 0.8) is reduced by a predetermined quantity (1 dB). Reducing only the transmission power of the data channel by a predetermined quantity (1 dB) allows the transmission powers of the other data channels to be kept unchanged, whereby there is no possibility that the mobile station $30_1$ is handed over to the other base stations such as the macro base station 10 from the femto base station 20.

Additionally, with the adjustment of the transmission power, the transmission power of each channel may be evenly reduced by an identical value (1 dB etc.) in some cases, and the maximum transmission power may be reduced by a predetermined quantity (1 dB) in some cases. However, the reduction is carried out at an extent with which the mobile station $30_1$ is not handed over to the other base stations such as the macro base station 10 from the femto base station 20. In this case, the transmission power adjuster 104 measures the received powers of the pilot signals of the macro base station 10 and the femto base station 20 in the mobile station $30_1$, and reduces the transmission power of each channel under the condition that the received power of the pilot signal of the femto base station 20 exceeds the received power of the pilot signal of the macro base station 10 by a predetermined quantity.

Further, after the transmission power adjuster 104 reduces the transmission power of the data channel because the averaged resource usage ratio of a certain mobile station $30_1$ is high, it gradually increases (for example, 1 dB) the reduced transmission power of the data channel so that it returns to the original value when the averaged resource usage ratio lowers (for example, when the index value of the utilization degree is equal to or less than a predetermined second threshold (<the first threshold). In the case other than it, for example, in the case that the averaged resource usage ratio is equal to or more than the second threshold, and is equal to or less than the first threshold, or the like, the transmission power adjuster 104 does not perform the adjustment of changing the transmission power.

And, the transmission power adjuster 104 gives an instruction for the adjusted transmission power value and the value of the reduction or the increase to the resource scheduler 102.

The resource scheduler 102 schedules the wireless resource of each mobile station $30_1$ by reflecting a notification of a new transmission power value etc. coming from the transmission power adjuster 104. Specifically, the resource scheduler 102 performs the scheduling in consideration of the changed transmission power per a resource block due to a reduction in the transmission power of the data channel.

Next, an operation of the first exemplary embodiment will be explained.

Figure 7:
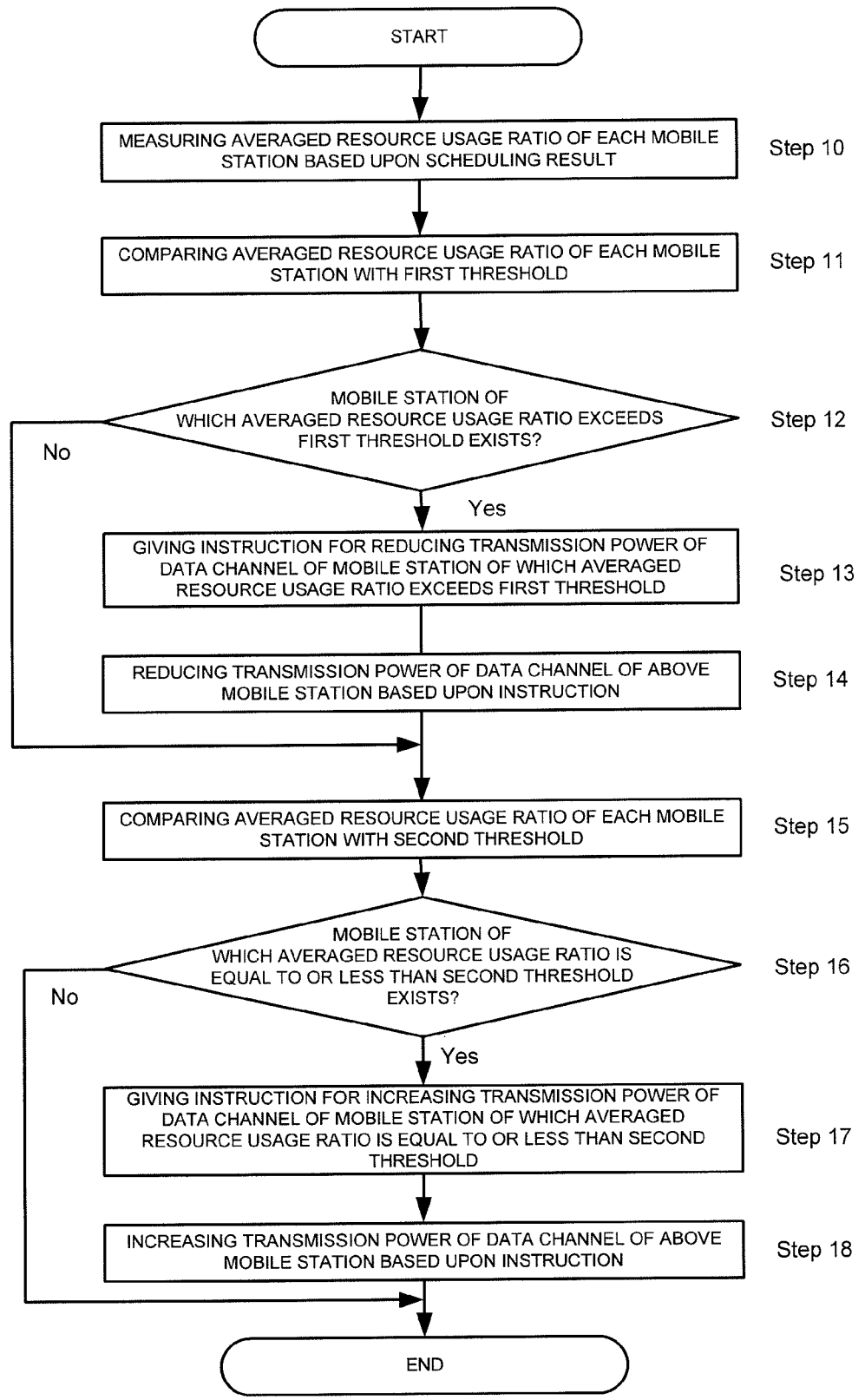
FIG. 7 is an operational flowchart of the first exemplary embodiment.

FIG. 7 is an operational flowchart of the first exemplary embodiment.

At first, the utilization degree measurer 103 measures the averaged resource usage ratio of each mobile station $30_1$ based upon the scheduling result by the resource scheduler 102 (Operation 10).

The transmission power adjuster 104 compares the averaged resource usage ratio of each mobile station $30_1$ with the first threshold according to the measurement result by the utilization degree measurer 103 (Operation 11).

When the mobile station $30_1$ of which the averaged resource usage ratio exceeds the first threshold exists (Operation 12), the transmission power adjuster 104 instructs the resource scheduler 102 to reduce the transmission power of the data channel of the above mobile station $30_1$ (Operation 13). The resource scheduler 102, upon receipt an instruction for reducing the setting value of the transmission power of the data channel of the above mobile station $30_1$ from the transmission power adjuster 104, performs the scheduling in consideration of the changed transmission power per a resource block, and reduces the transmission power of the data channel of the instructed mobile station $30_1$ (Operation 14).

On the other hand, when the mobile station $30_1$ of which the averaged resource usage ratio exceeds the first threshold does not exist (Operation 12), the operation proceeds to a Operation 15.

Continuously, the transmission power adjuster 104 compares the averaged resource usage ratio of the mobile station $30_1$ with the second threshold (Operation 15). When the mobile station $30_1$ of which the averaged resource usage ratio is equal to or less than the second threshold exists (Operation 16), the transmission power adjuster 104 instructs the resource scheduler 102 to increase the transmission power of the data channel of the above mobile station $30_1$ (Operation 17).

Additionally, when the averaged resource usage ratio of the mobile station $30_1$ is equal to or less than the first threshold, and exceeds the second threshold, the transmission power adjuster 104 does not give any instruction particularly, and keeps the current transmission power of the data channel.

The resource scheduler 102, upon receipt an instruction for increasing the setting value of the transmission power of the data channel of the mobile station $30_1$ from the transmission power adjuster 104, performs the scheduling in consideration of the changed transmission power per a resource block, and increases the transmission power of the data channel of the instructed mobile station $30_1$ (Operation 18).

As mentioned above, in accordance with the first exemplary embodiment, the wireless resource that is allocated to each mobile station connected to the femto base station is adjusted based upon the utilization degree of each mobile station connected to the femto base station, whereby the signal coming from the femto base station of a heavy user that exerts a large influence upon the signal of the macro base station is lessened, thereby making it possible to avoid a deterioration in the throughput in the macrocell.

In addition, also in the case that the mobile station of which the allocation of the wireless resource has been reduced because of the high utilization degree exists, the reduced wireless resource is increased when the utilization degree of the above mobile station is lowered, whereby there is no possibility that the state in which the allocation of the wireless resource is not sufficient permanently takes place.

Second Exemplary Embodiment

In the second exemplary embodiment, an example in which an external management server measures the utilization degree of each mobile station, and gives an instruction for the transmission power to the femto base station will be explained.

Figure 8:
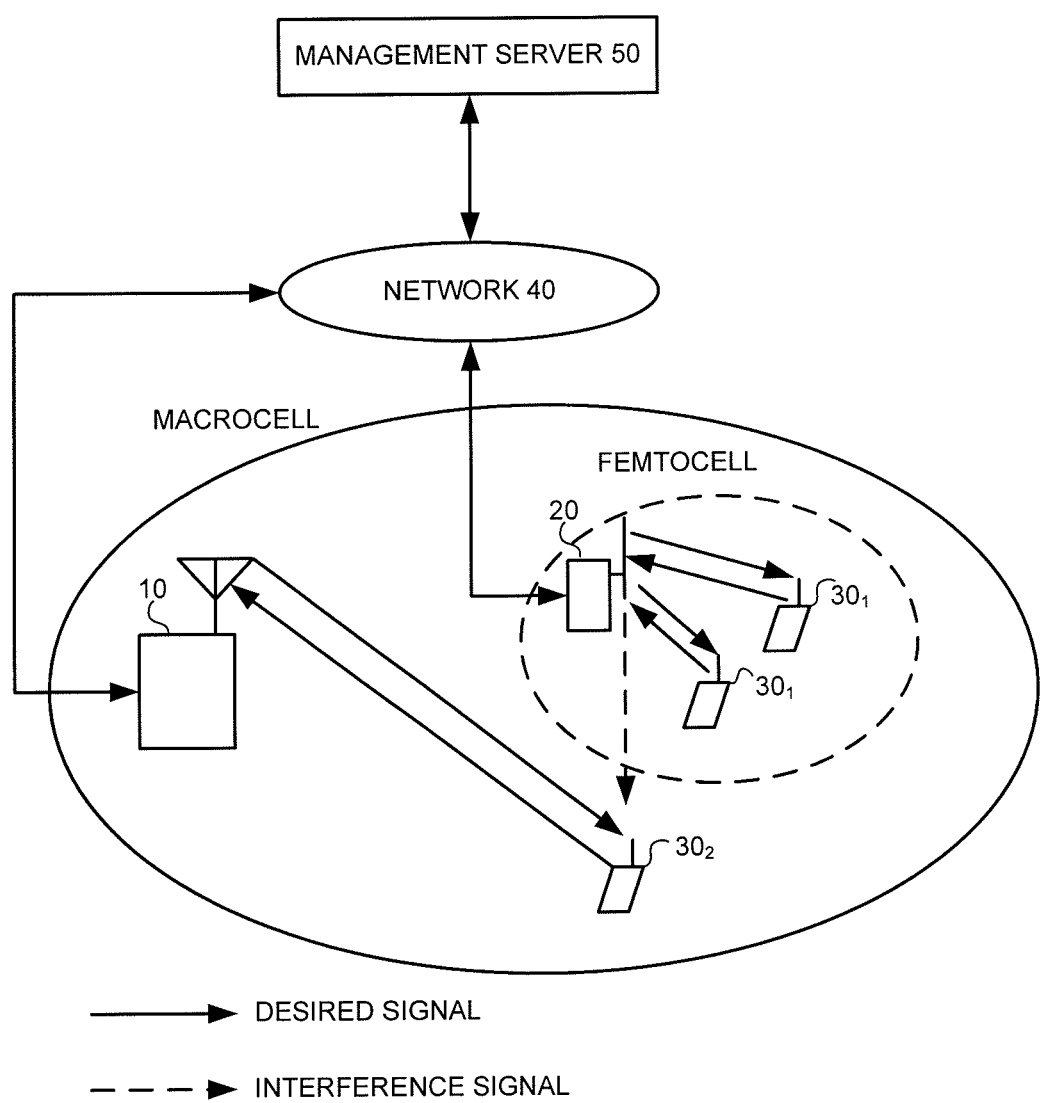
FIG. 8 is a schematic view of the wireless communication system of a second exemplary embodiment.

FIG. 8 is a schematic view of the wireless communication system of the second exemplary embodiment.

The macro base station 10 forms the macrocell, and is connected to the management server 50 via the network 40. Further, the mobile station $30_2$ existing within the macrocell is connected to the macro base station 10.

Further, the femto base station 20 forms the femtocell, and is connected to the management server 50 via the network 40. Further, a plurality of the mobile stations $30_1$ existing within the femtocell are connected to the femto base station 20.

Figure 9:
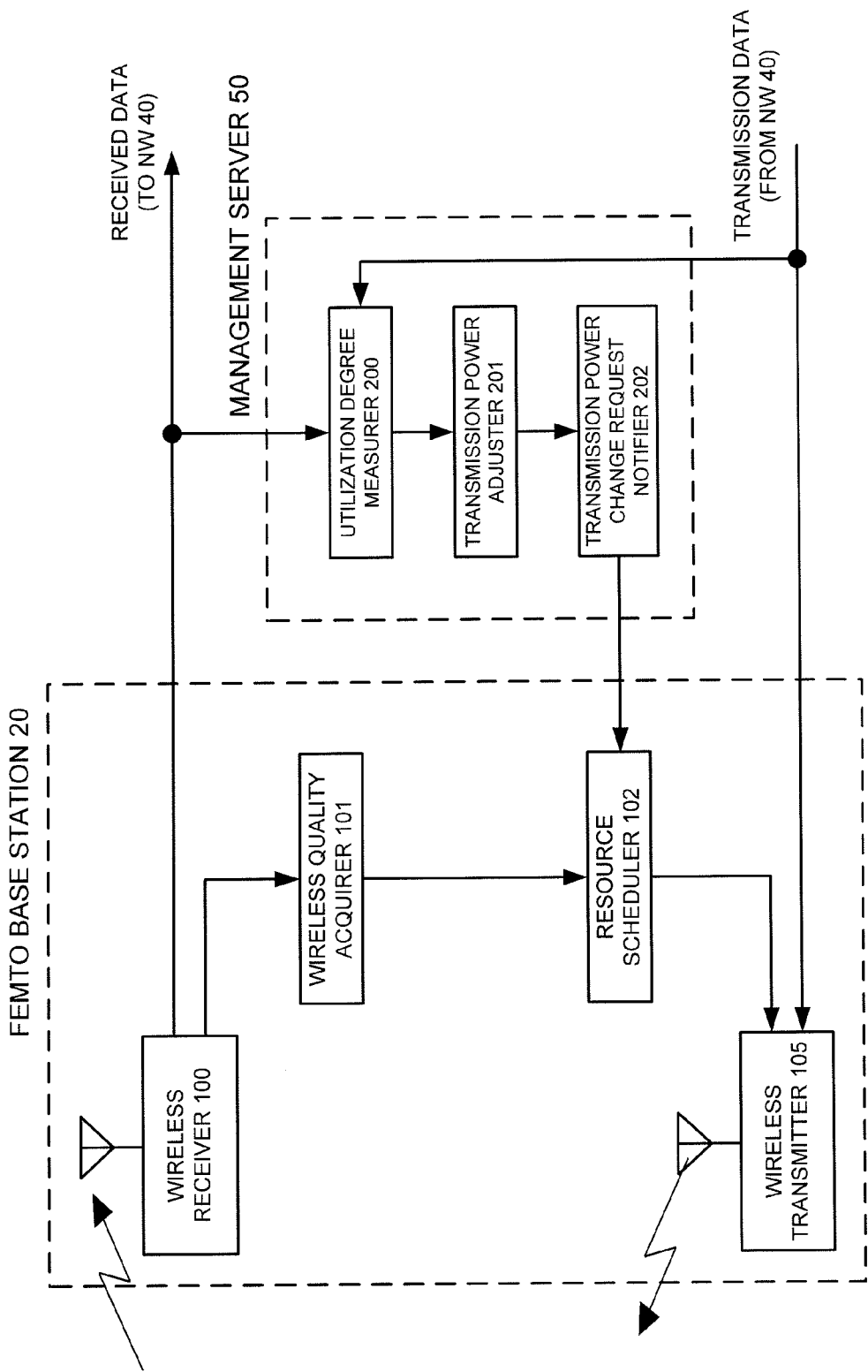
FIG. 9 is a block diagram of the femto base station 20 and a management server 50 of the second exemplary embodiment.

FIG. 9 is a block diagram of the femto base station 20 and the management server 50. Additionally, like reference numbers are used for elements identical to those of the first exemplary embodiment, and the detailed explanation thereof is omitted.

The management server 50 is provided with a utilization degree measurer 200, a transmission power adjuster 201, and a transmission power change request notifier 202.

The utilization degree measurer 200 measures the transmission traffic, being the data quantity per a predetermined observation time transmitted to the mobile station $30_1$ connected to the femto base station 20, as the utilization degree of each mobile station $30_1$. For example, when the data quantity of 1 GByte is transmitted for a certain day, the transmission traffic is 1 GByte/day. And, the utilization degree measurer 200 notifies the measured transmission traffic to the transmission power adjuster 201.

The transmission power adjuster 201 compares the transmission traffic of each mobile station $30_1$ notified by the utilization degree measurer 200 with the first threshold (for example, 1 GByte/day) for each predetermined observation time, and with regard to the mobile station $30_1$ of which the transmission traffic has exceeded the first threshold, notifies the adjustment of lowering the transmission power of the data channel of the above mobile station $30_1$ until the next observation time to the transmission power change request notifier 202. Additionally, in the case of this example, only the transmission power of the data channel is reduced by a predetermined quantity (1 dB), and the transmission powers of the other channels are not changed, whereby there is no possibility that the mobile station $30_1$ is handed over to other base stations such as the macro base station 10 from the femto base station 20, and when the transmission powers of all channels are lowered, the reduction is carried out at an extent with which the mobile station $30_1$ is not handed over to other base stations such as the macro base station 10 from the femto base station 20.

Further, when the transmission traffic is reduced after the transmission power of the data channel is reduced because the transmission traffic of a certain mobile station $30_1$ is high, (for example, the transmission traffic is equal to or less than the predetermined second threshold (<the first threshold), or the like), the transmission power adjuster 201 gradually increase (for example, 1 dB by 1 dB) the reduced transmission power of the data channel so that it returns to the original value. In the case other than it, for example, the transmission traffic is equal to or more than the second threshold, and is equal to or less than the first threshold, or the like, the transmission power adjuster 201 does not perform the adjustment of changing the transmission power.

The transmission power change request notifier 202 receives the setting value of the transmission power of the data channel of each mobile station $30_1$, the values of the reduction or the increase, and the like from the transmission power adjuster 201, and notifies them to the resource scheduler 102 of the femto base station 20.

Additionally, the management server 50 also can manage a plurality of the femto base stations. In this case, each femto base station acquires the utilization degrees of the mobile stations connected to the above femto base station, and adjusts the wireless resources for the mobile stations for each femto base station.

The resource scheduler 102 of the femto base station 20, similarly to the first exemplary embodiment, adjusts the wireless resource by reducing the transmission powers of the data channels of the mobile stations $30_1$ based upon the notification of the transmission power change request notifier 202.

Next, an operation of the second exemplary embodiment will be explained.

Figure 10:
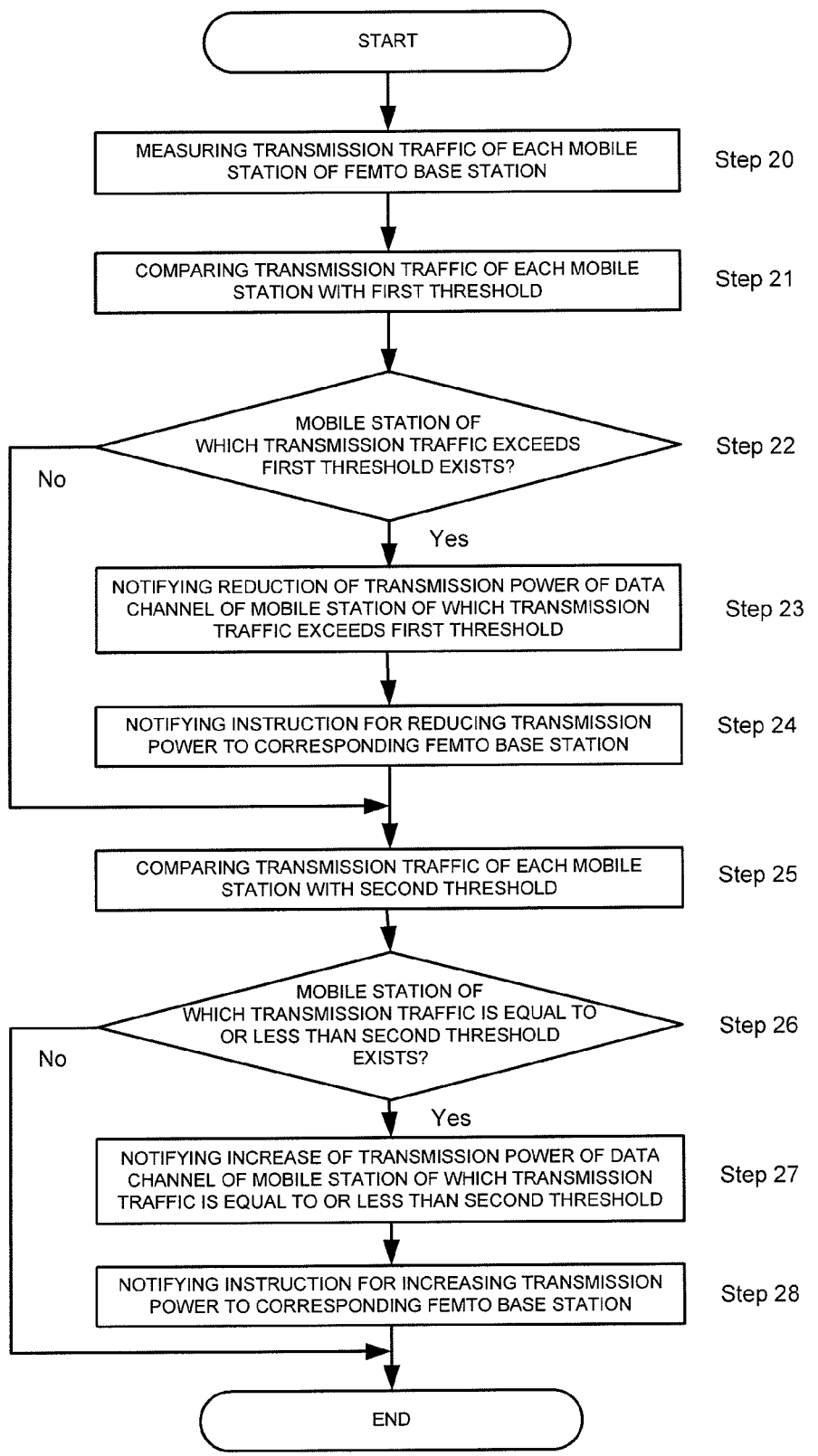
FIG. 10 is an operational flowchart of the management server 50 of the second exemplary embodiment.

FIG. 10 is an operational flowchart of the management server 50 of the second exemplary embodiment.

At first, the utilization degree measurer 200 measures the transmission traffic of each mobile station $30_1$ connected to the femto base station for each femto base station (Operation 20).

The transmission power adjuster 201 compares the transmission traffic of the mobile station $30_1$ of each femto base station with the first threshold for each predetermined observation time by the measurement result by the utilization degree measurer 200 (Operation 21).

When the mobile station $30_1$ of which the transmission traffic exceeds the first threshold exists (Operation 22), the transmission power adjuster 201 notifies the reduction of the transmission power of the data channel of the above mobile station $30_1$ to the transmission power change request notifier 202 (Operation 23). And, the transmission power change request notifier 202 notifies an instruction for the reduction of the transmission power of the mobile station $30_1$ received from the transmission power adjuster 201 to the femto base station in which the above mobile station $30_1$ exists (Operation 24).

On the other hand, when the mobile station $30_1$ of which the transmission traffic exceeds the first threshold does not exist (Operation 22), the operation proceeds to a Operation 25.

Continuously, the transmission power adjuster 201 compares the transmission traffic of the mobile station $30_1$ with the second threshold (Operation 25). When the mobile station $30_1$ of which the transmission traffic is equal to or less than the second threshold exists (Operation 26), the transmission power adjuster 201 notifies the increase of the transmission power of the data channel of the above mobile station $30_1$ to the transmission power change request notifier 202 (Operation 27). Additionally, when the transmission traffic of the mobile station $30_1$ is equal to or less than the first threshold, and exceeds the second threshold, the transmission power adjuster 201 does not give any instruction particularly, and keeps the current transmission power of the data channel.

The transmission power change request notifier 202 notifies the instruction for the increase of the transmission power of the mobile station $30_1$ received from the transmission power adjuster 201 to the femto base station in which the above mobile station $30_1$ exists (Operation 28).

Figure 11:
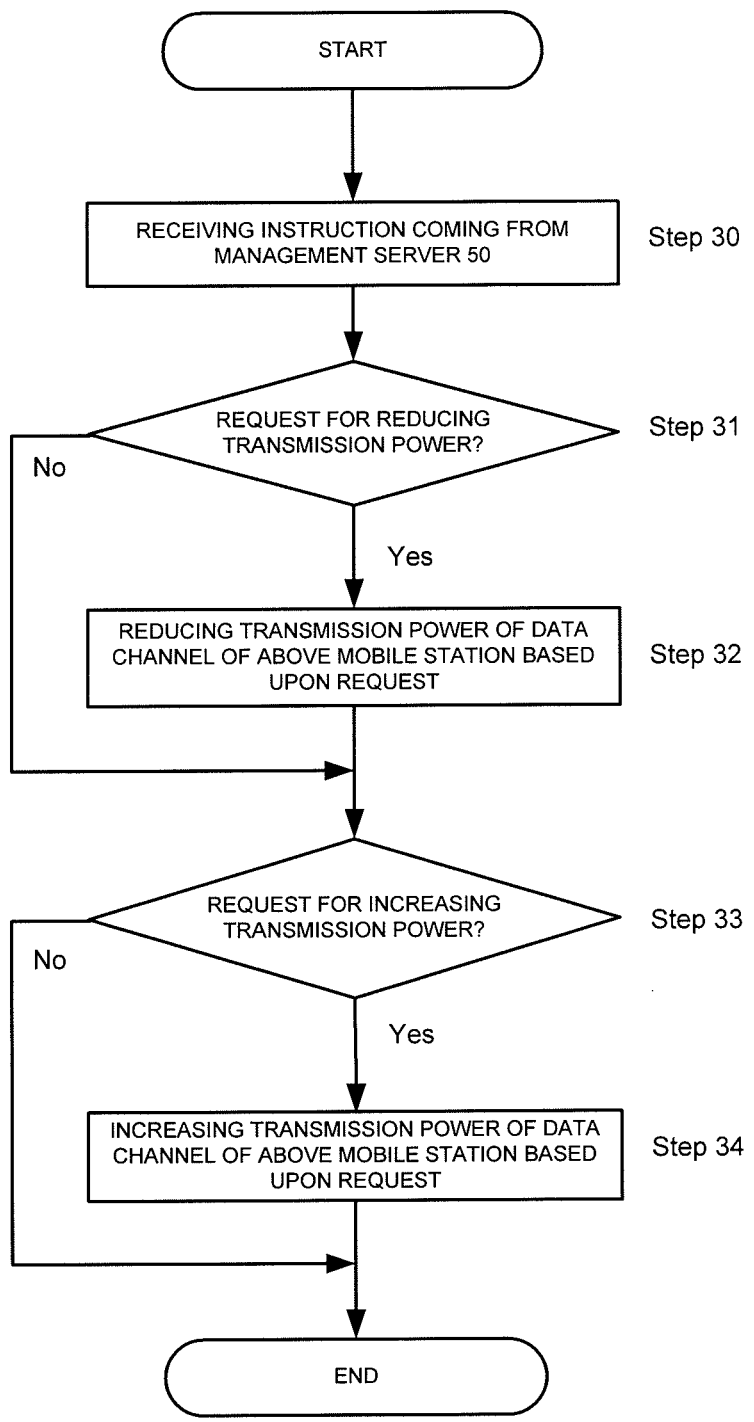
FIG. 11 is an operational flowchart of the femto base station 20 of the second exemplary embodiment.

Next, an operation of the femto base station 20 will be explained. FIG. 11 is an operational flowchart of the femto base station 20 of the second exemplary embodiment.

At first, the resource scheduler 102 receives an instruction from the management server 50 (Operation 30).

Next, when the instruction coming from the management server 50 states the reduction of the transmission power of the data channel of the mobile station $30_1$ (Operation 31), the resource scheduler 102 performs the scheduling in consideration of the changed transmission power per a resource block, and reduces the transmission power of the data channel of the mobile station $30_1$ instructed by the management server 50 (Operation 32).

On the other hand, when the instruction coming from the management server 50 does not state the reduction of the transmission power of the data channel of the mobile station $30_1$ (Operation 31), the operation proceeds to a Operation 33.

When the instruction coming from the management server 50 states the increase of the transmission power of the data channel of the mobile station $30_1$ (Operation 33), the resource scheduler 102 performs the scheduling in consideration of the changed transmission power per a resource block, and increases the transmission power of the data channel of the mobile station $30_1$ instructed by the management server 50 (Operation 34).

On the other hand, when the instruction received from the management server 50 does not state the increase of the transmission power of the data channel of the mobile station 301 (Operation 33), the operation is finished unless otherwise instructed.

In accordance with the second exemplary embodiment, as in the first exemplary embodiment, the processing load upon the femto base station is alleviated because the management server adjusts the wireless resource.

Third Exemplary Embodiment

Figure 12:
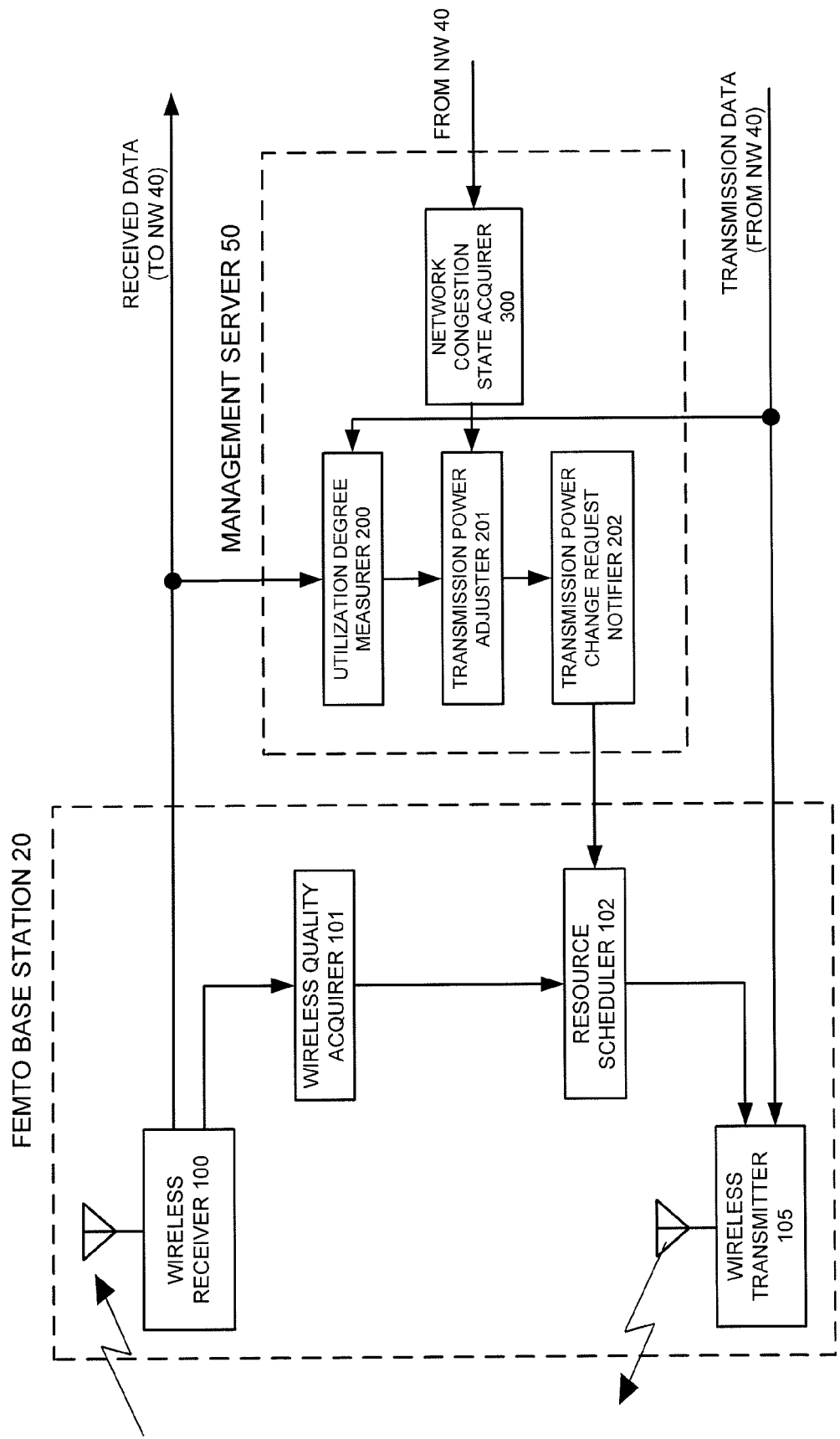
FIG. 12 is a block diagram of the femto base station 20 and the management server 50 of a third exemplary embodiment.

The third exemplary embodiment will be explained. FIG. 12 is a block diagram of the femto base station 20 and the management server 50 of the third exemplary embodiment. Additionally, like reference numbers are used for elements identical to those of the first and second exemplary embodiments, and the detailed explanation thereof is omitted.

In the third exemplary embodiment, as in to the configuration of the second exemplary embodiment, as shown in FIG. 12, the management server 50 is provided with a network congestion state acquirer 300 that acquires a congestion state of the network of the macro base station side. The network congestion state acquirer 300 acquires a congestion state of the traffic, which is transmitted to the mobile station $30_2$ from the macro base station 10, via the network 40 from the macro base station 10.

When it is determined that the network of the macro base station side is congested all the more than the congestion state acquired by the network congestion state acquirer 300 (for example, the transmission traffic of the macro base station side has exceeded a predetermined threshold), the transmission power adjuster 201 changes the wireless resource allocation of the mobile station $30_1$ responding to the utilization degree of the mobile station $30_1$. Specifically, the transmission power adjuster 201 arranges a plurality of the first thresholds for determining that the utilization degree is high, and enlarges the reduction quantity of the transmission power of the femto base station all the more as the utilization degree of the mobile station $30_1$ is higher.

For example, in a case where it is determined that the network of the macro base station side is not congested, similarly to the second exemplary embodiment, the transmission power adjuster 201 reduces the transmission power by 1 dB when the transmission traffic has exceeded 1 GByte/day with the first threshold taken as 1 GByte/day. On the other hand, in a case where it is determined that the network of the macro base station side is congested, the transmission power adjuster 201 arranges the first thresholds in a plural number like a first threshold A (for example, 0.5 GByte/day), a first threshold B (for example, 1 GByte/day), and a first threshold C (for example, 1.5 GByte/day), reduces the transmission power by X (for example, 1 dB) from a reference value when the transmission traffic of the mobile station $30_1$ has exceeded first threshold A (for example, 0.5 GByte/day), reduces the transmission power by Y (for example, 2 dB) from the reference value when the transmission traffic of the mobile station $30_1$ has exceeded first threshold B (for example, 1 GByte/day), and reduces the transmission power by Z (for example, 3 dB) from the reference value when the transmission traffic of the mobile station $30_1$ has exceeded first threshold C (for example, 1.5 GByte/day). In such a manner, the larger an influence of the interference upon the macro base station side is, the more greatly the transmission power is reduced, thereby making it possible to quickly recover the congestion of the macro base station side while the communication quality of the mobile station $30_1$ is maintained stepwise. Additionally, while the case of arranging three first thresholds was exemplified in the above, the number of the first thresholds is not limited hereto, and an arbitrary number may be used.

Next, an operation of the third exemplary embodiment will be explained. Additionally, points in which the third exemplary embodiment differs from the second exemplary embodiment will be explained with the points at a center.

Figure 13:
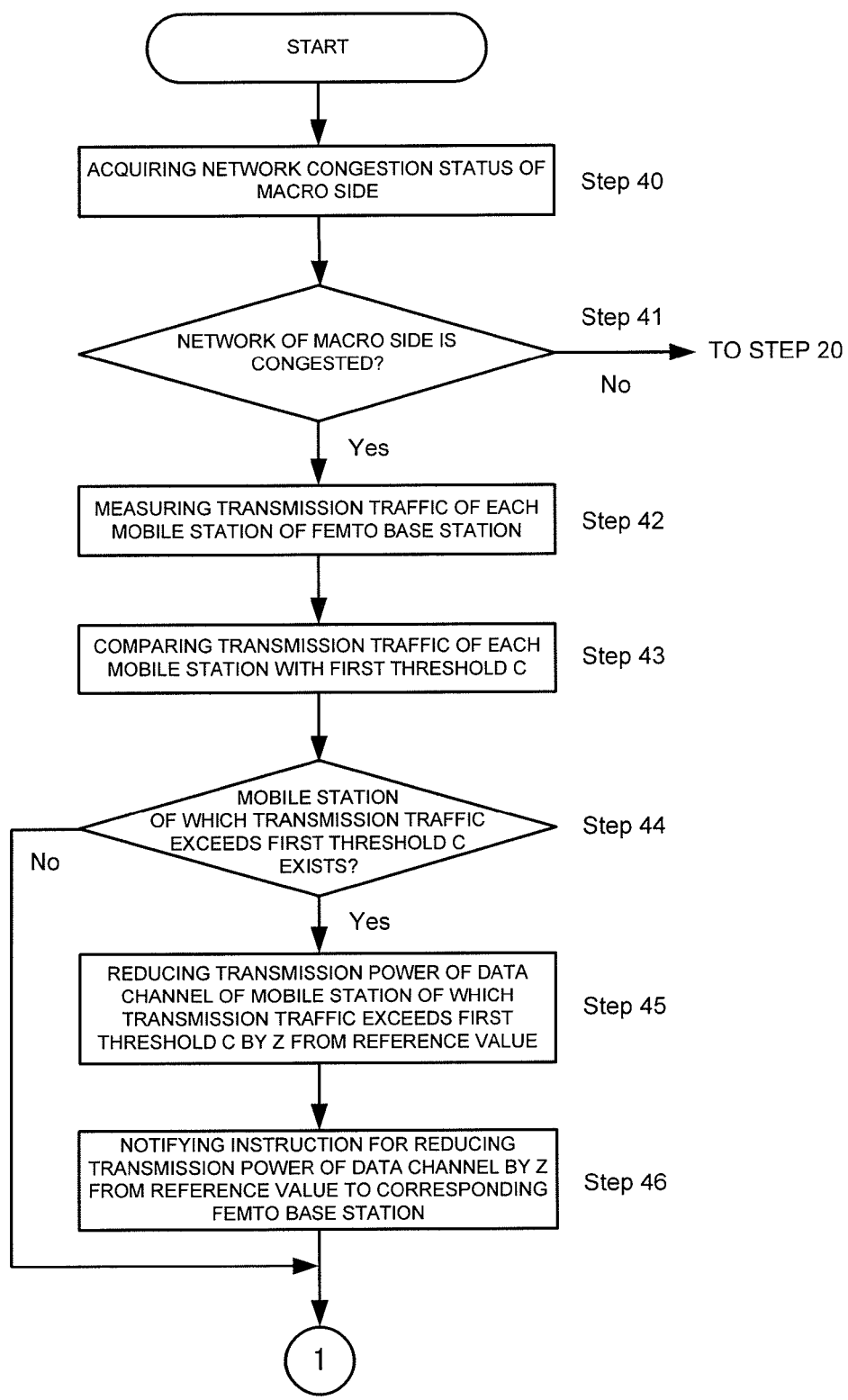
FIG. 13 is an operational flowchart of the management server 50 of the third exemplary embodiment.
Figure 14:
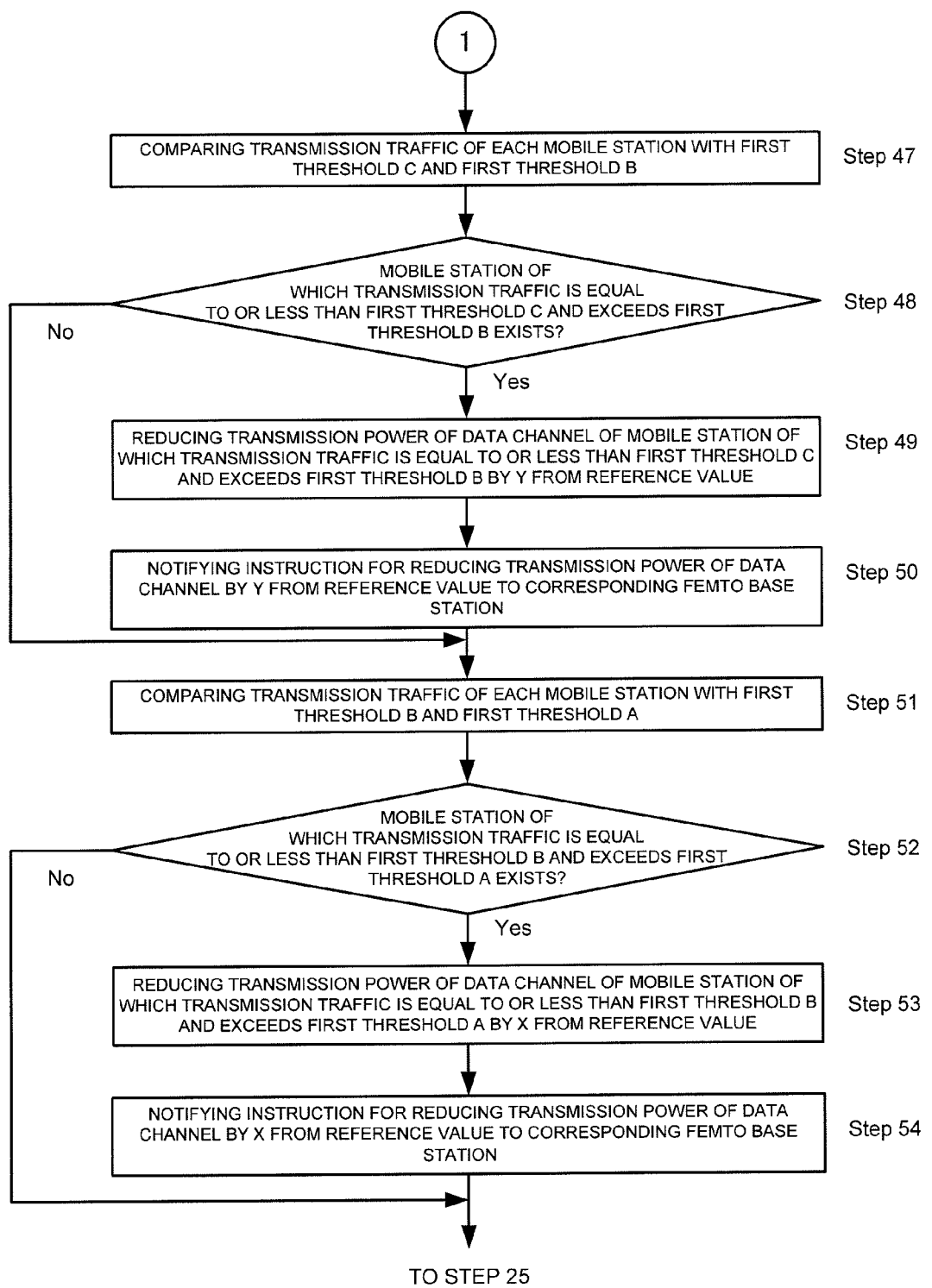
FIG. 14 is an operational flowchart of the management server 50 of the third exemplary embodiment.
Figure 15:
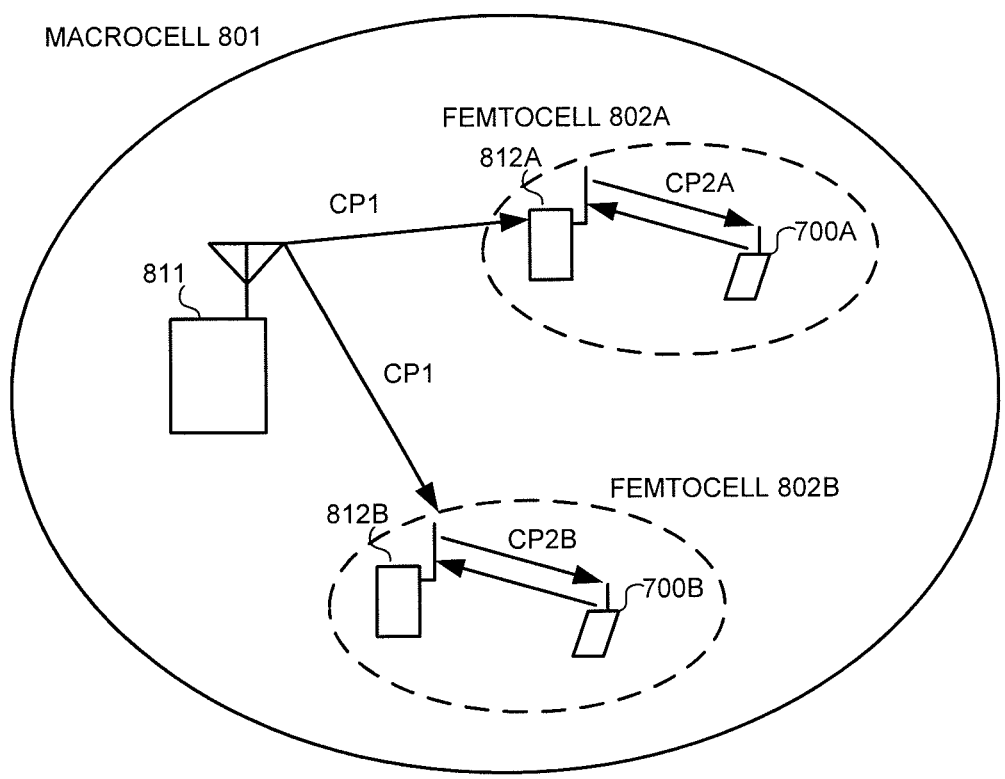
FIG. 15 is a view for explaining technology of the related art.
Figure 17:
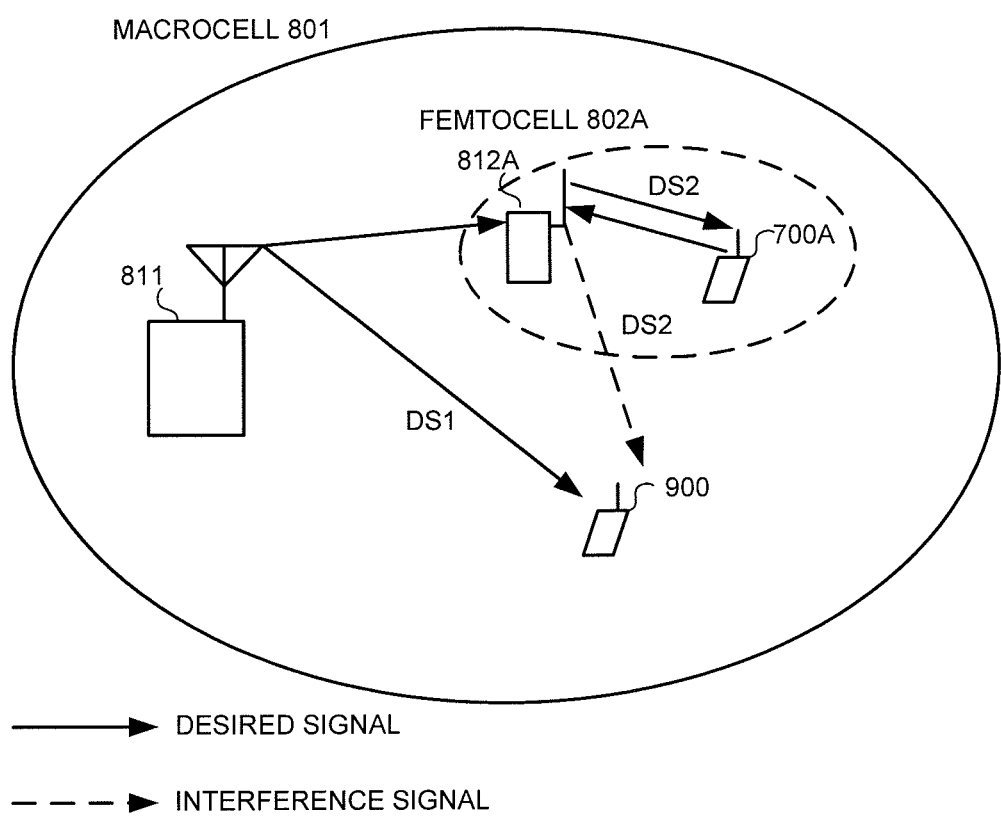
FIG. 17 is a view for explaining problems of the related art.

Each of FIG. 13 and FIG. 14 is an operational flowchart of the management server 50 of the third exemplary embodiment.

At first, the network congestion state acquirer 300 acquires the congestion state of the network of the macro base station side (Operation 40).

The network congestion state acquirer 300 determines whether the network of the macro base station side is congested based upon the acquired congestion state of the macro base station side, and when the network of the macro base station side is not congested (Operation 41), the operation proceeds to the Operation 20 of FIG. 10 in order to perform the process similar to that of the second exemplary embodiment.

On the other hand, when the network of the macro base station side is congested (Operation 41), the utilization degree measurer 200 measures the transmission traffic of each mobile station $30_1$ connected to the femto base station for each femto base station (Operation 42).

Continuously, the transmission power adjuster 201 compares the transmission traffic of the mobile stations $30_1$ of each femto base station with the first threshold C (for example, 1.5 GByte/day) for each predetermined observation time by the measurement result by the utilization degree measurer 200 (Operation 43).

When the mobile station $30_1$ of which the transmission traffic exceeds the first threshold C exists (Operation 44), the transmission power adjuster 201 notifies the effect that the transmission power of the data channel of the above mobile station $30_1$ is reduced by Z (for example, 3 dB) from the reference value to the transmission power change request notifier 202 (Operation 45). And, the transmission power change request notifier 202 notifies an instruction for reducing the transmission power of the mobile station $30_1$ received from the transmission power adjuster 201 to the femto base station in which the above mobile station $30_1$ exists (Operation 46).

On the other hand, when the mobile station $30_1$ of which the transmission traffic exceeds the first threshold C does not exist (Operation 44), the operation proceeds to a Operation 47.

Continuously, the transmission power adjuster 201 compares the transmission traffic of the mobile station $30_1$ with the first threshold C (for example, 1.5 GByte/day) and the first threshold B (for example, 1 GByte/day) (Operation 47). When the mobile station $30_1$ of which the transmission traffic is equal to or less than the first threshold C (for example, 1.5 GByte/day) and exceeds the first threshold B (for example, 1 GByte/day) exists (Operation 48), the transmission power adjuster 201 notifies the effect that the transmission power of the data channel of the above mobile station $30_1$ is reduced by Y (for example, 2 dB) from the reference value to the transmission power change request notifier 202 (Operation 49). And, the transmission power change request notifier 202 notifies an instruction for reducing the transmission power of the mobile station $30_1$ received from the transmission power adjuster 201 to the femto base station in which the above mobile station $30_1$ exists (Operation 50).

On the other hand, when the mobile station $30_1$ of which the transmission traffic is equal to or less than the first threshold C (for example, 1.5 GByte/day) and exceeds the first threshold B (for example, 1 GByte/day) does not exist (Operation 48), the operation proceeds to a Operation 51.

Continuously, the transmission power adjuster 201 compares the transmission traffic of the mobile station $30_1$ with the first threshold B (for example, 1 GByte/day) and the first threshold A (for example, 0.5 GByte/day) (Operation 51). When the mobile station $30_1$ of which the transmission traffic is equal to or less than the first threshold B (for example, 1 GByte/day) and exceeds the first threshold A (for example, 0.5 GByte/day) exists (Operation 52), the transmission power adjuster 201 notifies the effect that the transmission power of the data channel of the above mobile station $30_1$ is reduced by X (for example, 1 dB) from the reference value to the transmission power change request notifier 202 (Operation 53). And, the transmission power change request notifier 202 notifies an instruction for reducing the transmission power of the mobile station $30_1$ received from the transmission power adjuster 201 to the femto base station in which the above mobile station $30_1$ exists (Operation 54). Thereafter, the operation proceeds to the Operation 25 of FIG. 10 in order to perform the process similar to that of the second exemplary embodiment.

On the other hand, when the mobile station $30_1$ of which the transmission traffic is equal to or less than the first threshold B (for example, 1 GByte/day) and exceeds the first threshold A (for example, 0.5 GByte/day) does not exist (Operation 52), thereafter, the operation proceeds to the Operation 25 of FIG. 10 in order to perform the process similar to that of the second exemplary embodiment.

An operation of each femto base station 20 having received a notification for changing the transmission power from the management server 50 is similar to that of the second exemplary embodiment, so its explanation is omitted.

Additionally, in the above-described third exemplary embodiment, not only the determination of a choice between two things of whether or not the network of the macro base station side is congested may be made, but also a control may be taken by arranging the degrees of the congestion state of the network of the macro base station side in a plural number, and arranging the first thresholds in a plural number for each degree of the congestion state of the network.

As mentioned above, in accordance with the third exemplary embodiment, the larger an influence of the interference upon the macro base station side by the femto side is, the more greatly the transmission power of the femto side is reduced, thereby making it possible to quickly recover the congestion of the macro base station side while the communication quality of the mobile stations connected to the femto is maintained stepwise.

In addition, in the above-mentioned first, second, and third exemplary embodiments, the wireless resource allocation based upon the utilization degree may be changed according to an installation position of the femto base station. At this time, the femto base station 20 is provided with a configuration for receiving a radio wave that is transmitted from the macro base station 10, and other transmission sources (for example, a positioning satellite system etc. to be typified by GPS (Global Positioning System), and determines its own installation position based upon the received power of the radio wave. As a rule, walls and windows of the building exist between the femto base station and the transmission source of the radio wave in many cases because the femto base station is installed inside the building. When the walls of the building exist, a penetration loss of the radio wave becomes larger as compared with the case that the windows exist. Further, a penetration loss of the radio wave becomes larger with going deeper inside the building as compared with a penetration loss in the neighborhood of the wall. Thus, for example, when the femto base station is installed in the neighborhood of the window, a penetration loss is small, and the received power of the radio wave becomes relatively large, whereby it can be determined to some extent that the femto base station is installed in the neighborhood of the window.

When the femto base station is installed in the neighborhood of the window, to the contrary, an influence of the interference becomes large even though the transmission power is identical because a penetration loss into the outside of the building is also small. For this, when it is determined that the femto base station is installed in the neighborhood of the window, the transmission power responding to the utilization degree becomes is reduced more largely than the transmission power in the case where it is determined that the femto base station is installed in the back room of the building. Doing so makes it possible to reduce an influence of the interference upon the macro base station side all the more.

Further, the wireless communication technique for which these exemplary embodiments are applied is not limited particularly, and these exemplary embodiments are applicable, for example, for various wireless communication techniques including specifications etc. specified by LTE, W-CDMA, WLAN (Wireless Local Area Network), and IEEE 802.16m.

In addition, as apparent from the above-described explanation, while each unit can be configured with hardware, it also can be realized with a computer program. In this case, the function and the operation similar to the above-described exemplary embodiments are realized by a processor that operates under a program stored in a program memory. Additionally, it is also possible that only one part of the function of the above-described embodiments is realized with the computer program.

The whole or part of the exemplary embodiments disclosed above can be described as, but not limited to, the following supplementary notes.

(Supplementary note 1) A wireless communication system comprising a first base station and a second base station having a coverage area at least one part of which overlaps a coverage area of said first base station, comprising:

a measurer that measures utilization degrees of mobile stations connected to said second base station; and an adjuster that adjusts wireless resource allocation of said mobile stations connected to said second base station based upon said utilization degrees.

(Supplementary note 2) A wireless communication system according to supplementary note 1:

wherein said measurer individually measures the utilization degrees of the mobile stations that make communication via said second base station; and wherein said adjuster adjusts allocation of the wireless resource of each of said mobile stations based upon the utilization degree of each of said mobile stations.

(Supplementary note 3) A wireless communication system according to supplementary note 1 or supplementary note 2, wherein said adjuster adjusts the allocation of the wireless resources of said mobile stations so as to avoid an interference to said first base station.

(Supplementary note 4) A wireless communication system according to one of supplementary note 1 to supplementary note 3, wherein said adjuster reduces the allocation of the wireless resource of said mobile station when the utilization degree of said mobile station exceeds a predetermined threshold.

(Supplementary note 5) A wireless communication system according to one of supplementary note 1 to supplementary note 4, wherein said adjuster reduces the allocation of the wireless resource of said mobile station in such a manner that said mobile station is not handed over to said first base station.

(Supplementary note 6) A wireless communication system according to one of supplementary note 1 to supplementary note 5, wherein when a plurality of said mobile stations make a connection, said adjuster reduces the wireless resource to be allocated to said mobile station of which said utilization degree has exceeded a predetermined threshold, and increases a wireless resource quantity that is not used in said second base station.

(Supplementary note 7) A wireless communication system according to one of supplementary note 1 to supplementary note 6, wherein said adjuster arranges a first threshold and a second threshold, reduces the wireless resource that is allocated to the mobile station of which said utilization degree has exceeded said first threshold, and increases the wireless resource that is allocated to the mobile station of which said utilization degree is equal to or less than said second threshold.

(Supplementary note 8) A wireless communication system according to one of supplementary note 1 to supplementary note 7, wherein said adjuster adjusts a reduction quantity of the allocation of the wireless resource of said mobile station responding to an installation position of said second base station.

(Supplementary note 9) A wireless communication system according to one of supplementary note 1 to supplementary note 8, comprising an acquisition means that acquires a congestion state of a network of the first base station, wherein said adjuster adjusts a reduction quantity of the allocation of the wireless resource of said mobile station responding to said acquired congestion state.

(Supplementary note 10) A wireless communication system according to one of supplementary note 1 to supplementary note 9, wherein said measurer measures at least one of a resource usage ratio of said mobile station that makes communication via said second base station, a transmission traffic or a throughput indicative of a data quantity transmitted per a predetermined observation time, a time ratio at which data has been actually transmitted within a predetermined period, and a time ratio at which the resource usage ratio has exceeded a predetermined threshold within a predetermined period, or a combination thereof as the utilization degree of said mobile station.

(Supplementary note 11) A wireless communication system according to one of supplementary note 1 to supplementary note 10, wherein said adjuster performs at least one of the adjustment of reducing the transmission power of said second base station, the adjustment of reducing a frequency band, and the adjustment of reducing a transmission time slot, or a combination thereof as the adjustment of the wireless resource of said mobile station.

(Supplementary note 12) A wireless communication system according to supplementary note 11, wherein said adjuster reduces the transmission power of a data channel of the mobile station, being a target of adjusting the wireless resource.

(Supplementary note 13) A wireless communication system according to one of supplementary note 1 to supplementary note 12, wherein said second base station comprises said measurer and said adjuster.

(Supplementary note 14) A wireless communication system according to one of supplementary note 1 to supplementary note 12:

wherein a management server connected to said second base station via the network comprises said measurer and said adjuster; and wherein said adjuster instructs said second base station to adjust the wireless resource allocation.

(Supplementary note 15) A base station having a coverage area at least one part of which overlaps a coverage area of other base station, comprising:

a measurer that measures utilization degrees of mobile stations connected to its own base station; and an adjuster that adjusts wireless resource allocation of said mobile stations connected to said its own base station based upon said utilization degrees.

(Supplementary note 16) A management server in a wireless communication system that comprises a first base station and a second base station having at least one part of which overlaps a coverage area of said first base station, said management server connected to said second base station via a network, comprising:

a measurer that measures utilization degrees of mobile stations connected to said second base station; and an adjuster that instructs said second base station to adjust wireless resource allocation of said mobile stations connected to said second base station based upon said utilization degrees.

(Supplementary note 17) A wireless communication method in a wireless communication system comprising: a first base station; and a second base station having a coverage area at least one part of which overlaps a coverage area of said first base station, comprising:

measuring utilization degrees of mobile stations connected to said second base station; and adjusting wireless resource allocation of said mobile stations connected to said second base station based upon said utilization degrees.

Above, while exemplary embodiments have been particularly shown and described, the inventive concept is not limited to the above mentioned exemplary embodiments. It will be understood by those of ordinary skill in the art that various changes in form and details may be made therein without departing from the spirit and scope of the inventive concept as defined by the claims.

What is claimed is:

1. A wireless communication system comprising:
   a macro base station; and
   a femto base station having a coverage area at least one part of which overlaps a coverage area of said macro base station,
   wherein the wireless communication system comprises:
   a measurer that measures an amount of data communicated between each of a plurality of mobile stations and said femto base station, and calculates a utilization degree of each of said plurality of mobile stations based on the amount of data measured for each of the plurality of mobile stations, respectively; and
   an adjuster that adjusts a wireless resource allocation of at least one mobile station of said plurality of mobile stations so as not to perform a handover to a macro base station when said utilization degree of said at least one mobile station exceeds a predetermined threshold.

2. The wireless communication system according to claim 1,
wherein said adjuster adjusts the allocation of the wireless resources of said at least one mobile station so as to avoid an interference to said macro base station.

3. The wireless communication system according to claim 1,
wherein said adjuster reduces the allocation of the wireless resource of said at least one mobile station when the utilization degree of said at least one mobile station exceeds the predetermined threshold.

4. The wireless communication system according to claim 1,
wherein said adjuster reduces the allocation of the wireless resource of said at least one mobile station while maintaining said at least one mobile station in communication with said femto base station.

5. The wireless communication system according to claim 1,
wherein said adjuster reduces the wireless resource to be allocated to said at least one mobile stations, and increases a wireless resource quantity that is not used in said femto base station.

6. The wireless communication system according to claim 1,
wherein said predetermined threshold is a first threshold, and said at least one mobile station is a first mobile station, and
said adjuster reduces the wireless resource that is allocated to said first mobile station, and increases the wireless resource that is allocated to a second mobile station of said plurality of mobile stations connected to said femto base station, wherein said utilization degree of said second mobile station is equal to or less than a second threshold.

7. The wireless communication system according to claim 1,
wherein said adjuster adjusts a reduction quantity of the allocation of the wireless resource of said at least one mobile station based on an installation position of said femto base station.

8. The wireless communication system according to claim 1,
further comprises an acquirer that acquires a congestion state of a network of the macro base station,
wherein said adjuster adjusts a reduction quantity of the allocation of the wireless resource of said at least one mobile station based on said acquired congestion state.

9. The wireless communication system according to claim 1,
wherein the utilization degree is at least one of a resource usage ratio of said at least one mobile station, a transmission traffic or a throughput indicative of a data quantity transmitted per a predetermined observation time, a time ratio at which data has been actually transmitted within a predetermined period, and a time ratio at which the resource usage ratio has exceeded a predetermined threshold within a predetermined period.

10. The wireless communication system according to claim 1,
wherein the wireless resource allocation is at least one of reducing the transmission power of said femto base station, reducing a frequency band, and reducing a transmission time slot.

11. The wireless communication system according to claim 1,
wherein the wireless resource allocation is reducing the transmission power of a data channel of said at least one mobile station.

12. The wireless communication system according to claim 1,
wherein said femto base station comprises said measurer and said adjuster.

13. The wireless communication system according to one of claim 1,
further comprising a management server connected to said femto base station via the network, wherein said management server comprises said measurer and said adjuster; and
wherein said adjuster instructs said femto base station to adjust the wireless resource allocation.

14. A femto base station having a coverage area at least one part of which overlaps a coverage area of a macro base station, comprising:
a measurer that measures an amount of data communicated between each of a plurality of mobile stations and the base station, and calculates a utilization degree of each of the plurality of mobile stations based on the amount of data measured for each of the plurality of mobile stations, respectively; and
an adjuster that adjusts a wireless resource allocation of at least one mobile station of said plurality of mobile stations so as not to perform a handover to a macro base station when said utilization degree of said at least one mobile station exceeds a predetermined threshold.

15. A management server in a wireless communication system that comprises a macro base station and a femto base station having at least one part of which overlaps a coverage area of said macro base station, said management server connected to said femto base station via a network, said management server comprising:
a measurer that measures an amount of data communicated between each of a plurality of mobile stations and said femto base station, and calculates a utilization degree of each of said plurality of mobile stations based on the amount of data measured for each of said plurality of mobile stations, respectively; and
an adjuster that instructs said femto base station to adjust a wireless resource allocation of at least one mobile station of said plurality of mobile stations so as not to perform a handover to a macro base station when said utilization degree of said at least one mobile station exceeds a predetermined threshold.

16. A wireless communication method in a wireless communication system comprising:
a macro base station; and
a femto base station having a coverage area at least one part of which overlaps a coverage area of said macro base station
wherein said wireless communication method comprises
measuring an amount of data communicated between each of a plurality of mobile stations and said femto base station;
calculating a utilization degree of each of said plurality of mobile stations based on the amount of data measured for each of the plurality of mobile stations, respectively; and adjusting a wireless resource allocation of at least one mobile station of said plurality of mobile stations so as not to perform a handover to a macro base station when said utilization degree of said at least one mobile station exceeds a predetermined threshold.

17. A computer-implemented wireless communication method of a femto base station having a coverage area which at least partially overlaps a coverage area of a macro base station, said wireless communication method comprising executing on a processor:
   measuring an amount of data communicated between each of a plurality of mobile stations and said femto base station;
   calculating a utilization degree of each of said plurality of mobile stations based on the amount of data measured for each of the plurality of mobile stations, respectively; and
   adjusting a wireless resource allocation of at least one mobile station of said plurality of mobile stations so as not to perform a handover to a macro base station when said utilization degree of said at least one mobile station exceeds a predetermined threshold.

* * * * *